(12) United States Patent
Okuno et al.

(10) Patent No.: US 7,849,260 B2
(45) Date of Patent: Dec. 7, 2010

(54) STORAGE CONTROLLER AND CONTROL METHOD THEREOF

(75) Inventors: Takahide Okuno, Odawara (JP); Mitsuhide Sato, Oiso (JP); Toshiaki Minami, Odawara (JP); Hiroaki Yuasa, Ninomiya (JP); Kousuke Komikado, Odawara (JP); Koji Iwamitsu, Odawara (JP); Tetsuya Shirogane, Odawara (JP); Atsushi Ishikawa, Minami-ashigara (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/698,022

(22) Filed: Jan. 26, 2007

(65) Prior Publication Data

US 2008/0126668 A1     May 29, 2008

(30) Foreign Application Priority Data

Nov. 28, 2006    (JP)   ............................. 2006-319807

(51) Int. Cl.
    *G06F 13/10*      (2006.01)

(52) U.S. Cl. ................ 711/113; 711/114; 711/E12.025; 711/E12.035; 714/6; 714/9; 714/E11.092; 710/22

(58) Field of Classification Search .................. 711/100, 711/112
     See application file for complete search history.

(56) References Cited

U.S. PATENT DOCUMENTS

| | | | | |
|---|---|---|---|---|
| 5,790,775 A | * | 8/1998 | Marks et al. .................... | 714/9 |
| 5,822,251 A | * | 10/1998 | Bruce et al. ............ | 365/185.33 |
| 5,975,738 A | * | 11/1999 | DeKoning et al. ............. | 700/79 |
| 7,603,485 B2 | * | 10/2009 | Komikado et al. .............. | 710/5 |
| 2001/0049774 A1 | * | 12/2001 | Otterness et al. ............. | 711/148 |
| 2006/0161707 A1 | * | 7/2006 | Davies et al. ................ | 710/268 |

FOREIGN PATENT DOCUMENTS

| | | |
|---|---|---|
| JP | 09-146842 | 11/1995 |
| JP | 11-312058 | 4/1998 |

\* cited by examiner

*Primary Examiner*—Reginald G Bragdon
*Assistant Examiner*—Daniel J Bernard
(74) *Attorney, Agent, or Firm*—Volpe and Koenig, P.C.

(57) ABSTRACT

Proposed is a storage controller and its control method for speeding up the processing time in response to a command in a simple manner while reducing the load of a controller that received a command targeting a non-associated logical volume. This storage controller includes a plurality of controllers for controlling the input and output of data to and from a corresponding logical unit based on a command retained in a local memory, and the local memory stores association information representing the correspondence of the logical units and the controllers and address information of the local memory in each of the controllers of a self-system and another-system. Upon receiving a command sent from a host computer, the controller determines whether the target logical unit is associated with the controller of a self-system or another-system based on the association information, and, when the logical unit is associated with the other-system controller, the controller transfers and stores the command to and in the corresponding other-system controller based on the address information.

12 Claims, 18 Drawing Sheets

FIG.2A
■MEMORY SPACE VIEWED FROM PROCESSOR

| ARD | CTL0 MEMORY MAP (CTL0 PROCESSOR SIDE) | CTL1 MEMORY MAP (CTL1 PROCESSOR SIDE) |
|---|---|---|
| 0x0_00000000-0x0_7FFFFFFF | CT_0 LOCAL MEMORY | CTL1 LOCAL MEMORY |
| 0x0_80000000-0x0_FFFFFFFF | CT_0 BRIDGE REGISTER | CTL1 BRIDGE REGISTER |
| 0x1_00000000-0x1_7FFFFFFF | CT_0 HOST COMMUNICATION PROTOCOL CHIP REGISTER | CTL1 HOST COMMUNICATION PROTOCOL CHIP REGISTER |
| | CT_0 STORAGE APPARATUS COMMUNICATION PROTOCOL CHIP REGISTER | CTL1 STORAGE APPARATUS COMMUNICATION PROTOCOL CHIP REGISTER |
| 0x1_80000000-0x1_FFFFFFFF | CT_0 DATA TRANSFER CONTROL UNIT REGISTER | CTL1 DATA TRANSFER CONTROL UNIT REGISTER |
| 0x2_00000000-0x5_FFFFFFFF | CT_0&1 CACHE MEMORY (INCLUDING EXPANSION (1) TO (3)) | CTL0&1 CACHE MEMORY (INCLUDING EXPANSION (1) TO (3)) |
| 0x6_00000000-0x6_FFFFFFFF | CT_1 LOCAL MEMORY | CTL0 LOCAL MEMORY |
| 0x6_80000000-0x6_FFFFFFFF | CT_1 BRIDGE REGISTER | CTL0 BRIDGE REGISTER |
| 0x7_00000000-0x7_7FFFFFFF | CT_1 HOST COMMUNICATION PROTOCOL CHIP REGISTER | CTL0 HOST COMMUNICATION PROTOCOL CHIP REGISTER |
| | CT_1 STORAGE APPARATUS COMMUNICATION PROTOCOL CHIP REGISTER | CTL0 STORAGE APPARATUS COMMUNICATION PROTOCOL CHIP REGISTER |
| 0x7_80000000-0x7_FFFFFFFF | CT_1 DATA TRANSFER CONTROL UNIT REGISTER | CTL0 DATA TRANSFER CONTROL UNIT REGISTER |

30A / 30B / 30C

FIG.2B
■MEMORY SPACE VIEWED FROM HOST COMMUNICATION PROTOCOL CHIP

| ARD | CTL0 MEMORY MAP (CTL0 HOST COMMUNICATION PROTOCOL CHIP SIDE) | CTL1 MEMORY MAP (CTL1 HOST COMMUNICATION PROTOCOL CHIP SIDE) |
|---|---|---|
| 0x0_00000000-0x0_7FFFFFFF | CT_0 LOCAL MEMORY | CTL1 LOCAL MEMORY |
| 0x0_80000000-0x0_FFFFFFFF | CT_1 LOCAL MEMORY | CTL0 LOCAL MEMORY |
| 0x1_00000000-0xF_7FFFFFFF | CT_0&1 CACHE MEMORY (INCLUDING EXPANSION (1) TO (3)) | CTL0&1 CACHE MEMORY (INCLUDING EXPANSION (1) TO (3)) |

| LUN | ASSOCIATED CONTROLLER # | ASSOCIATED PROCESSOR # | PROCESSING FLAG |
|---|---|---|---|
| 0 | CTL0 | MP0 | HOST 0-0 |
| 1 | CTL1 | MP1 | HOST 0-1 |
| 2 | CTL0 | MP0 | HOST 1-0 |
| 3 | CTL1 | MP1 | HOST 0-2 |
| 4 | CTL0 | MP0 | HOST 0-3 |
| 5 | CTL1 | MP1 | HOST 1-1 |

| MEMORY | MEMORY ADDRESS AREA | SEGMENT BLOCK | TOP SEGMENT ADDRESS | OPEN FLAG |
|---|---|---|---|---|
| LM0 | 0x0_00000000 – 0x0_7FFFFFFF | a | LA000 | 0 |
| | | b | LA100 | 1 |
| | | c | LA200 | 0 |
| | | ... | ... | ... |
| LM1 | 0x6_00000000 – 0x6_7FFFFFFF | d | LB000 | 1 |
| | | e | LB100 | 1 |
| | | F | LB200 | 0 |
| | | ... | ... | ... |
| 44C | 44D | 44E | 44F | 44G |

| MEMORY | MEMORY ADDRESS AREA | SEGMENT BLOCK | TOP SEGMENT ADDRESS | TIME STAMP | DIRTY FLAG |
|---|---|---|---|---|---|
| CM0 | CA000-CA999 | A | CA000 | aa:aa | 1 |
| | | B | CA100 | bb:bb | 0 |
| | | C | CA200 | cc:cc | 0 |
| | | ... | ... | ... | ... |
| CM1 | CB000-CB999 | D | CB000 | dd:dd | 1 |
| | | E | CB100 | ee:ee | 0 |
| | | F | CB200 | ff:ff | 1 |
| | | ... | ... | ... | ... |
| 45C | 45D | 45E | 45F | 45G | 45H |

45A(45B)

STORAGE CONTROLLER AND CONTROL METHOD THEREOF

CROSS REFERENCES

This application relates to and claims priority from Japanese Patent Application No. 2006-319807, filed on Nov. 28, 2006, the entire disclosure of which is incorporated herein by reference.

BACKGROUND

The present invention generally relates to a storage controller and its control method, and in particular is suitable for application in a storage apparatus comprising a plurality of microprocessors for controlling I/O requests of information from a host computer.

Conventionally, a storage apparatus has been demanded of higher reliability and faster response. In light of this, technology is known for redundantly storing data between a plurality of controllers, and executing data processing through distribution. Japanese Patent Laid-Open Publication No. H9-146842 discloses technology for executing processing based on a command received by one controller with both processors; namely, a processor comprising the controller that received the command, and a processor comprising the other controller.

SUMMARY

Meanwhile, the storage subsystem disclosed in Japanese Patent Laid-Open Publication No. H9-146842 is a storage subsystem comprising multiplexed controllers. The processor of each controller is associated with a logical volume, and, upon receiving a command targeting a non-associated logical volume, request processing to the processor associated with such logical volume is executed.

Nevertheless, with this storage subsystem, even when the controller receives a command targeting a non-associated logical volume from the host computer, the data transfer between the host computer and the cache memory based on such command is processed with the processor in the controller that received the command. Thus, with the foregoing storage subsystem, when the number of commands received between a plurality of multiplexed controllers becomes biased, there is a problem in that the load will be concentrated on the controller that received numerous commands.

Further, with the foregoing storage subsystem, when the controller receives a command targeting a non-associated logical volume, that controller will have to analyze the command and communicate with the controller associated to such logical volume so as to request such controller to perform processing according to the command, and there is a problem in that the controller that received the command targeting the non-associated logical volume will be burdened with an unnecessary load, and the processing time of the overall storage subsystem in response to the command will be delayed.

Accordingly, with the foregoing storage subsystem, in order to speed up the processing time of the overall subsystem in response to the command, it is necessary to set the host computer to issue commands to microprocessors and controllers associated with the target logical volume, and there is a problem in that much labor and time are required for such setting process.

The present invention was made in view of the foregoing points. Thus, an object of the present invention is to propose a storage controller and its control method for speeding up the processing time in response to a command in a simple manner while reducing the load of the controller that received a command targeting a non-associated logical volume.

In order to achieve the foregoing object, the present invention provides a storage controller for controlling the input and output of data to and from a plurality of logical units between a host computer as an upper-level device, and a storage apparatus that provides the logical units configured from a storage extent for reading and writing data from and in the host computer. The storage controller comprises a plurality of controllers having a local memory for retaining a command given from the host computer, and which control the input and output of data to and from the corresponding logical unit based on the command retained in the local memory, and an inter-controller connection path for connecting the plurality of controllers in a communicable state. The local memory stores association information representing the correspondence of the logical units and the controllers, and address information of the local memory in each of the controllers of a self-system and another-system. Upon receiving a command sent from the host computer, the controller determines whether the target logical unit is associated with the controller of a self-system or another-system based on the association information, and, when the logical unit is associated with the other-system controller, the controller transfers and stores the command to and in the corresponding other-system controller based on the address information.

Thereby, with this storage controller, when the controller receives a command targeting a logical unit associated with another-system controller, the processing of the controller that received the command communicating with the other-system controller and requesting the other-system controller to perform processing according to such command will no longer be required. As a result, upon the transfer of the command, it is possible to effectively prevent an unnecessary load from arising in the controller that received the command based on the communication, and a delay from occurring in the processing time in response to the command. Further, in the foregoing case, there is no need to configure any setting in the host computer.

The present invention also provides a control method of a storage controller for controlling the input and output of data to and from a plurality of logical units between a host computer as an upper-level device, and a storage apparatus that provides the logical units configured from a storage extent for reading and writing data from and in the host computer. The storage controller comprises a plurality of controllers having a local memory for retaining a command given from the host computer, and which control the input and output of data to and from the corresponding logical unit based on the command retained in the local memory, and an inter-controller connection path for connecting the plurality of controllers in a communicable state. The local memory stores association information representing the correspondence of the logical units and the controllers, and address information of the local memory in each of the controllers of a self-system and another-system. The control method comprises a first step of the controller, upon receiving a command sent from the host computer, determining whether the target logical unit is associated with the controller of a self-system or another-system based on the association information, and a second step of the controller, when the logical unit is associated with the other-system controller, transferring and storing the command to and in the corresponding other-system controller based on the address information.

Thereby, with this control method, when the controller receives a command targeting a logical unit associated with another-system controller, the processing of the controller that received the command communicating with the other-system controller and requesting the other-system controller to perform processing according to such command will no longer be required. As a result, upon the transfer of the command, it is possible to effectively prevent an unnecessary load from arising in the controller that received the command based on the communication, and a delay from occurring in the processing time in response to the command. Further, in the foregoing case, there is no need to configure any setting in the host computer.

According to the present invention, it is possible to realize a storage controller and its control method capable of speeding up the processing time in response to a command in a simple manner while reducing the load of the controller that received a command targeting a non-associated logical volume.

DESCRIPTION OF DRAWINGS

FIG. 2A is a chart showing an example of a memory space to be recognized by the 0-system and 1-system microprocessors, and FIG. 2B is a chart showing an example of a memory space to be respectively recognized by the 0-system and 1-system host communication protocol chips 10A, 10B;

FIG. 5 is a conceptual diagram showing the configuration of a logical unit/processor association table;

FIG. 6 is a conceptual diagram showing the configuration of a local memory information table;

FIG. 7 is a conceptual diagram showing the configuration of a cache memory information table;

DETAILED DESCRIPTION

An embodiment of the present invention is now explained with reference to the attached drawings.

Figure 1:
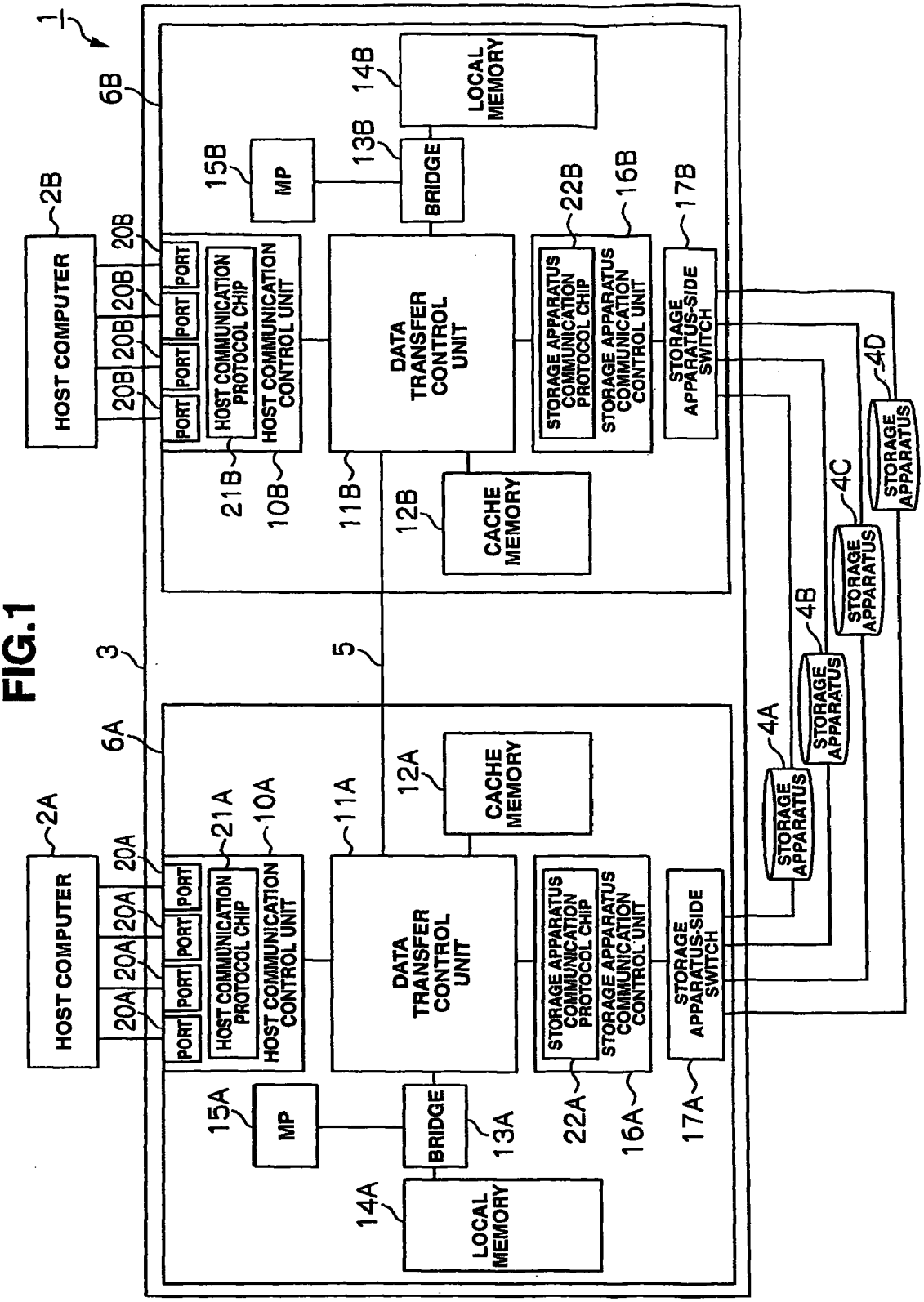
FIG. 1 is a block diagram showing the configuration of a storage system according to an embodiment of the present invention.

(1) First Embodiment (1-1) Configuration of Storage System in Present Embodiment FIG. 1 shows the overall storage system 1 according to the present embodiment. The storage system 1 is configured by host computers 2A, 2B being connected to a plurality of storage apparatuses 4A to 4D via a storage controller 3.

The host computers 2A, 2B, for instance, are computers comprising information processing resources such as a CPU (Central Processing Unit) and a memory, and are specifically configured from a personal computer, a workstation, a mainframe or the like. The host computers 2A, 2B are provided with a communication port (for example, a port provided to a LAN card or a host bus adapter) for accessing the storage controller 3, and are able to send a data I/O request command to the storage controller 3 via this communication port.

The storage controller 3 is configured from 0-system and 1-system controllers 6A, 6B respectively connected to different host computers, and an inter-controller connection path 5 for connecting these controllers 6A, 6B in a communicable state.

As the inter-controller connection path 5, for instance, a bus based on a PCI (Peripheral Component Interconnect)-Express standard for realizing high-speed data communication where the data transfer volume per direction of one lane (maximum of 8 lanes) is 2.5 [Gbit/sec] is used. The transfer of data and various information between the 0-system and 1-system controllers 6A, 6B as described above is all conducted via the inter-controller connection path 5.

The respective controllers 6A, 6B are used for controlling the reading and writing of data from and in the storage apparatuses 4A to 4D according to a request from the host computers 2A, 2B respectively connected to a self controller, and comprise host communication control units 10A, 10B, data transfer control units 11A, 11B, cache memories 12A, 12B, bridges 13A, 13B, local memories 14A, 14B, microprocessors 15A, 15B, storage apparatus communication control units 16A, 16B, storage apparatus-side switches 17A, 17B, and the like.

Among the above, the host communication control units 10A, 10B are interfaces for performing communication control with the host computers 2A, 2B, and have a plurality of communication ports 20A, 20B, and host communication protocol chips 21A, 21B.

The communication ports 20A, 20B are used for connecting the controllers 6A, 6B to a network or the host computers 2A, 2B, and, for instance, are respectively allocated with a unique network address such as an IP (Internet Protocol) address or a WWN (World Wide Name).

The host communication protocol chips 21A, 21B perform protocol control during communication with the host computers 2A, 2B. Thus, as the host communication protocol chips 21A, 21B, for example, a fibre channel conversion protocol chip is used when the communication protocol with the host computers 2A, 2B is a fibre channel (FC: Fibre Channel) protocol, and an iSCSI protocol chip is used when the communication protocol is an iSCSI protocol. In other words, an adequate protocol chip is applied to the communication protocol with the host computers 2A, 2B.

Further, the host communication protocol chips 21A, 21B are equipped with a multi microprocessor function for enabling the communication between a plurality of microprocessors, and the host communication protocol chips 21A, 21B are thereby able to communicate with both the microprocessor 15A in the 0-system controller 6A and the microprocessor 15B in the 1-system controller 6B.

The data transfer control units 11A, 11B have a function for controlling the data transfer between the 0-system and 1-system controllers 6A, 6B and the data transfer between the respective elements in the 0-system controller 6A or the 1-system controller 6B. Further, the data transfer control units 11A, 11B have a function for duplicating (dual-writing) the write data provided from the host computers 2A, 2B in the designated cache memories 12A, 12B based on a command from the self-system microprocessors 15A, 15B. Specifically, when the 0-system microprocessor 15A or the 1-system microprocessor 15B stores data in the self-system cache memories 12A, 12B, it also writes this data in the other-system cache memories 12B, 13A (dual writing).

Moreover, in order to make the information stored in the shared areas 32A, 32B (FIG. 2) of the self-system and other-system local memories 14A, 14B constantly the same, when information in one of the shared areas 32A, 32B is updated, the data transfer control units 11A, 11B similarly update the information in the other shared area 32B or 32A.

The bridges 13A, 13B are relay devices for connecting the self-system microprocessors 15A, 15B and the local memories 14A, 14B to the self-system data transfer control units 11A, 11B, respectively, and extract only corresponding data among the data flowing through the bus connecting the host communication control units 10A, 10B, the data transfer control units 11A, 11B, the storage apparatus communication control units 16A, 16B, and the cache memories 12A, 12B, and transfer such corresponding data to the microprocessors 15A, 15B and the local memories 14A, 14B.

The microprocessors 15A, 15B respectively have a function for governing the operational control of the overall self-system controllers 6A, 6B. These microprocessors 15A, 15B, as described later, perform processing such as reading and writing data from and in a logical volume that is exclusively allocated to oneself in advance (this is hereinafter referred to as an "associated logical volume") according to a write command or a read command stored in the local memories 14A, 14B.

The allocation of such associated logical volume to the respective microprocessors 15A, 15B can be dynamically changed depending on the load status of the respective microprocessors 15A, 15B, or based on the reception of an associated microprocessor designation command designating the associated microprocessor for each logical volume provided from the host computers 2A, 2B. Further, the allocation of the associated logical volume to the respective microprocessors 15A, 15B can be dynamically changed based on the failure status in the connection path between the storage controller 3 and the host computers 2A, 2B, or the connection path between the storage controller 3 and the storage apparatuses 4A to 4D.

The local memories 14A, 14B are used for storing various control programs, and for temporarily retaining various commands such as read commands and write commands provided from the host computers 2A, 2B. The microprocessors 15A, 15B process the read commands and write commands stored in the local memories 14A, 14B in the order they were stored in such local memories 14A, 14B.

The cache memories 12A, 12B are primarily used for temporarily storing data transferred between the host computers 2A, 2B and the storage apparatuses 4A to 4D, or between the 0-system and 1-system controllers 6A, 6B.

The storage apparatus communication control units 16A, 16B are interfaces for controlling the communication with the respective storage apparatuses 4A to 4D, and comprise storage apparatus communication protocol chips 22A, 22B. As the storage apparatus communication protocol chips 22A, 22B, for instance, an FC protocol chip can be used when applying an FC hard disk drive as the storage apparatuses 4A to 4D, and a SAS protocol chip can be used when applying a SAS hard disk drive as the storage apparatuses 4A to 4D. Further, when applying a SATA hard disk drive as the storage apparatuses 4A to 4D, the FC protocol chip or the SAS protocol chip can be used as the storage apparatus communication protocol chips 22A, 22B, and configured to be connected to the SATA hard disk drive via a SATA protocol conversion chip.

The storage apparatus-side switches 17A, 17B are switches for switching the storage apparatuses 4A to 4D to become the communication counterpart, and, for instance, a SAS-Expander or an FC loop switch can be used. Further, as a substitute of the storage apparatus-side switches 17A, 17B, for example, the configuration may use the FC loop to connect to the storage apparatuses 4A to 4D.

The storage apparatuses 4A to 4D, for instance, are configured as a disk array device mounted with a plurality of hard disk drives; specifically, FC hard disk drives, SAS hard disk drives and/or SATA hard disk drives. A plurality of logical units as logical storage extents for reading and writing data can be set in the storage extent provided by such plurality of hard disk drives.

When setting the logical units, the reliability and response can be improved by applying RAID technology among the plurality of storage apparatuses 4A to 4D. Specifically, various RAID levels such as "RAID 0", "RAID 1", "RAID 3", "RAID 5", "RAID 6" or "RAID 0+1" can be set for each logical unit.

Further, as the storage device to be mounted on the storage apparatuses 4A to 4D, in substitute for the hard disk drives, a semiconductor memory such as a flash memory, or an optical disk device can be used. As the flash memory, a first type that is inexpensive with a relatively slow write speed and a low write cycle, or a second type that is expensive and capable of write command processing that is faster than the first type, and with a greater write cycle than the first type can be used.

In addition, such first and/or second type of flash memory can be mounted together with a hard disk drive to configure a storage device to be used in the storage apparatuses 4A to 4D.

(1-2) Command Processing in Storage System (1-2-1) Memory Configuration and Table Configuration The command processing performed in the storage controller 3 of the storage system 1 is now explained.

In the case of this storage system 1, the memory space of the respective controllers 6A, 6B of the 0-system and 1-system configuring the storage controller 3 is mapped with the memory area in the self-system controllers 6A, 6B, as well as the memory area in the other-system controllers 6B, 6A, respectively. Thereby, the 0-system and 1-system controllers 6A, 6B are able to directly access the memory area in the other-system controllers 6B, 6A.

When the microprocessors 15A, 15B in the 0-system and 1-system controllers 6A, 6B are given a write command or a read command targeting the logical unit allocated from the host computers 2A, 2B to the other-system controllers 6B, 6A, they write such write command or read command in the other-system local memories 14B, 14A so as to transfer the same to the other-system controllers 6B, 6A.

Like this, with the storage system 1, when a write command or a read command to be executed by the other-system controllers 6B, 6A is given from the host computers 2A, 2B to the 0-system controller 6A or the 1-system controller 6B, since such write command or read command is relayed by being directly written in the other-system local memories 14B, 14A, the 0-system and 1-system controllers 6A, 6B are not required to communicate with each other to transfer the write command or the read command, and the write command processing or the read command processing can be performed faster as a result.

Here, FIG. 2A shows a memory map of the memory space to be recognized respectively by the microprocessors 15A, 15B of the 0-system (CTL0) and the 1-system (CTL1), and FIG. 2B shows a memory map of the memory space to be recognized respectively by the 0-system and 1-system host communication protocol chips 10A, 10B.

In FIG. 2A, the memory space recognized by the 0-system microprocessor 15A is a memory space configured from a storage extent (extent of address area stored in the "ADR" field 30A) provided respectively by the memory or register registered in the field 30A of the "CTL0 Memory Map (CTL0 processor)", and the memory area recognized by the 1-system microprocessor 15B is a memory space configured from a storage extent (extent of address area stored in the "ADR" field 30A) provided respectively by the memory or register registered in the field 30C of the "CTL1 Memory Map (CTL1 processor)".

Further, in FIG. 2B, the memory space recognized by the 0-system host communication protocol chip 10A is a memory space configured from a storage extent (extent of address area stored in the "ADR" field 31A) provided respectively by the memory or register registered in the field 31A of the "CTL0 Memory Map (CTL0 host communication protocol chip)", and the memory area recognized by the 1-system host communication protocol chip 10B is a memory space configured from a storage extent (extent of address area stored in the "ADR" field 31A) provided respectively by the memory or register registered in the field 31C of the "CTL1 Memory Map (CTL1 host communication protocol chip)".

Among the memory map data in FIG. 2A and FIG. 2B, the address ("0x0_00000000-0x0_7FFFFFFF") of the self-system local memories 14A, 14B and the address ("0x0_80000000-0x0_FFFFFFFF") of the self-system bridges 13A, 13B are respectively stored in advance as first address information in a flash memory not shown connected to the self-system microprocessors 15A, 15B, and the other addresses shown in FIG. 2A are stored in advance as second address information in a register not shown provided in the self-system data transfer control units 11A, 11B.

The respective microprocessors 15A, 15B of the 0-system and the 1-system are able to respectively recognize the memory space as illustrated in FIG. 2A and FIG. 2A based on the first and second address information stored in the flash memory and the register. Based on the results of such recognition, in addition to the local memories 14A, 14B and the cache memories 12A, 12B in the self-system, the microprocessors 15A, 15B are also able to access the local memories 14A, 14A and the cache memories 12B, 12A of the other-system.

Figure 3A:
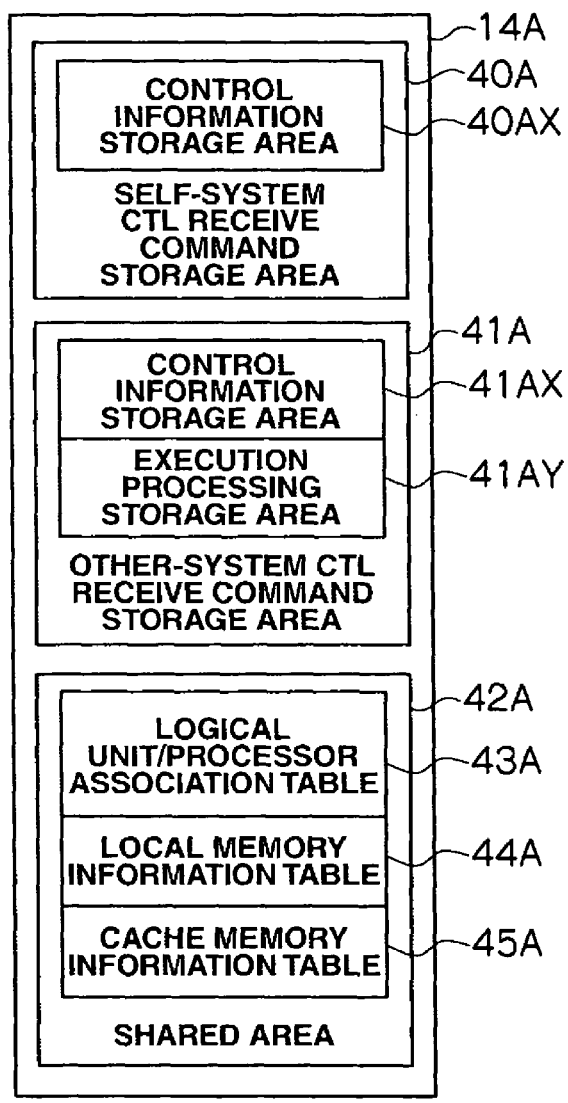
FIG. 3A is a conceptual diagram showing the memory configuration of a 0-system local memory.
Figure 3B:
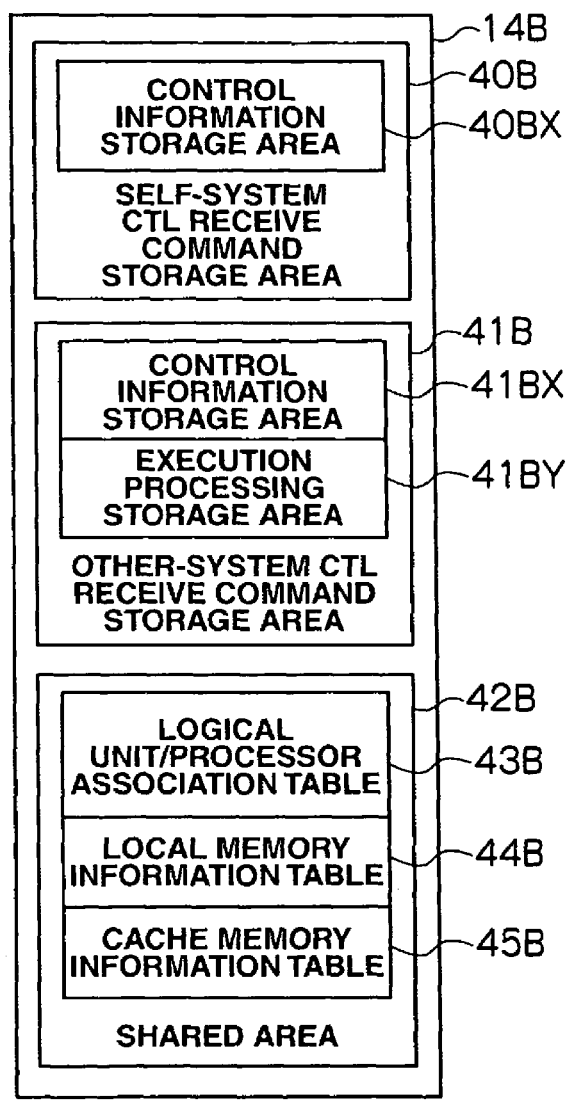
FIG. 3B is a conceptual diagram showing the memory configuration of a 1-system local memory.

Meanwhile, FIG. 3A and FIG. 3B respectively show the memory configuration of the local memories 14A, 14B in the 0-system and 1-system controllers 6A, 6B. As shown in FIG. 3A and FIG. 3B, with the storage system 1, the storage extent of the 0-system and 1-system local memories 14A, 14B is managed by being divided into three separate storage extents of the self-system controller receive command storage areas 40A, 40B, the other-system controller receive command storage areas 41A, 41B, and the shared areas 42A, 42B.

Among the above, control information storage areas 40AX, 40BX are provided in the self-system controller receive command storage areas 40A, 40B, and commands such as write commands and read commands received by the self-system host communication control units 10A, 10B are stored in the control information storage areas 40AX, 40BX.

Further, control information storage areas 41AX, 41BX and execution processing storage areas 41AY, 41BY are provided in the other-system controller receive command storage areas 41A, 41B, and general commands and control information received by the host communication control units 10B, 10A of the other-system controllers 6B, 6A are stored in the control information storage areas 41AX, 41BX. Moreover, the execution processing storage areas 41AY, 41BY store the execution processing contents after the receive command is analyzed in the other-system controllers 6B, 6A upon the self-system controllers 6A, 6B newly handling the processing concerning the associated logical unit of the other-system controllers 6B, 6A.

Further, the shared areas 32A, 32B store logical unit/processor association tables 43A, 43B, local memory information tables 44A, 44B, and cache memory information tables 45A, 45B. The logical unit/processor association tables 43A, 43B, the local memory information tables 44A, 44B and the cache memory information tables 45A, 45B will be described later.

Figure 4A:
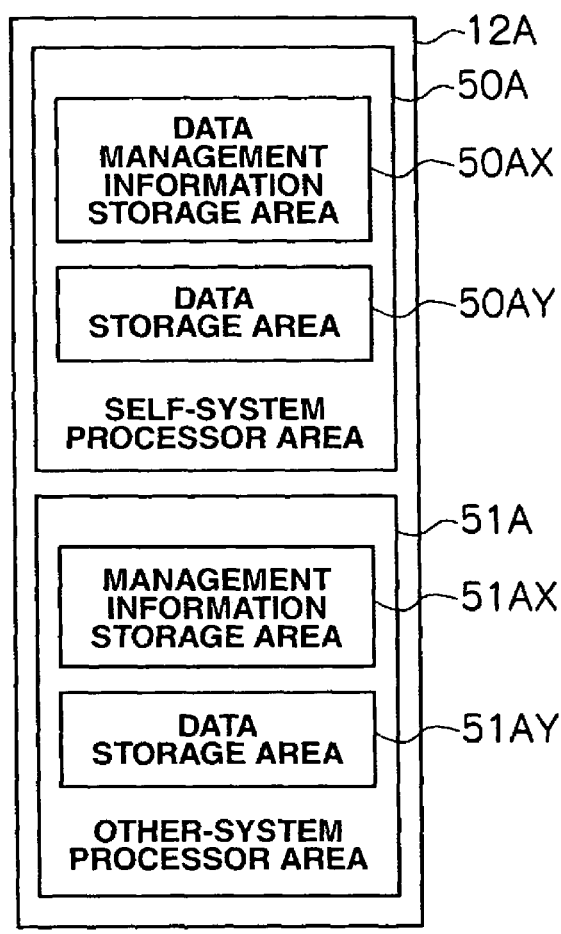
FIG. 4A is a conceptual diagram showing the memory configuration of a 0-system cache memory.
Figure 4B:
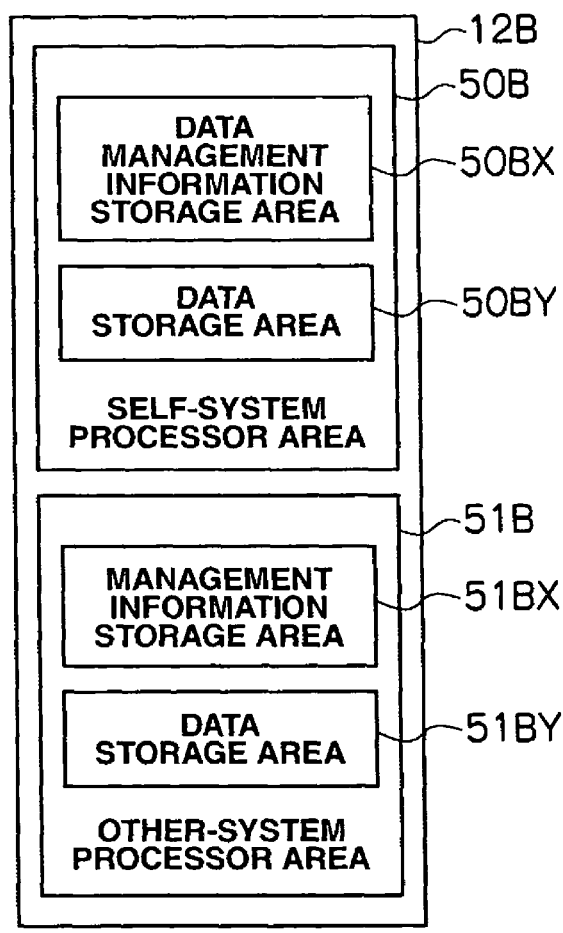
FIG. 4B is a conceptual diagram showing the memory configuration of a 1-system cache memory.

Meanwhile, FIG. 4A and FIG. 4B respectively show the memory configuration of the cache memories 12A, 12B in the respective controllers 6A, 6B of the 0-system and the 1-system. As shown in FIG. 4A and FIG. 4B, with the storage system 1, the storage extent of the 0-system and 1-system cache memories 12A, 12B is managed by being dividing into two separate storage extents of the self-system processor areas 50A, 50B and the other-system processor areas 51A, 51B.

The self-system processor areas 50A, 50B are areas to be primarily used by the self-system microprocessor, and are configured from the data storage areas 50AY, 50BY for temporarily storing data upon transferring data between the host computers 2A, 2B and the storage apparatuses 4A to 4D, and the data management information storage areas 50AX, 50BX for storing management information of data to be stored in the data storage areas 50AY, 50BY.

Data stored in the data storage areas 50AY, 50BY and management information stored in the data management information storage areas 50AX, 50BX are thereafter duplicated (dual written) by the data transfer control units 11A, 11B in the corresponding data storage areas 51BY, 51AY or the data management information storage areas 51BX, 51AX in the other-system microprocessor storage areas 51B, 51A of the other-system cache memories 12B, 12A.

Further, the other-system microprocessor storage areas 51A, 51B are areas for duplicating (dual writing) information stored in the self-system controller storage areas 50B, 50A in the other-system cache memories 12B, 12A.

Incidentally, management information is information for managing data stored in the cache memories 12A, 12B, and is configured from information showing whether such data is read data or write data, and a data guarantee code for guaranteeing the data between the microprocessors 15A, 15B and the host communication protocol chips 21A, 21B.

FIG. 5 to FIG. 7 respectively show the foregoing logical unit/processor association tables 43A, 43B, the local memory information tables 44A, 44B, and the cache memory information tables 45A, 45B.

Among the above, the logical unit/processor association tables 43A, 43B are tables for managing the correspondence of the respective logical units and the microprocessors 15A, 15B to handle the processing concerning the logical units (these are hereinafter referred to as "associated microprocessors" as appropriate), and, as shown in FIG. 5, are configured from a "LUN (Logical Unit Number)" field 43C, an "associated controller number" field 43D, an "associated processor number" field 43E, and a "processing flag" field 43F.

The "LUN" field 43C stores a LUN of each logical unit defined in the storage apparatuses 4A to 4D, and the "associated controller number" field 43D stores an identifier of the controllers 6A, 6B to handle the processing concerning such logical unit (these are hereinafter referred to as "associated controllers" as appropriate).

The "associated processor number" field 43E stores an identifier of the associated microprocessor of the corresponding logical unit. Incidentally, the "associated processor number" field 43E is provided for managing which one is the associated microprocessor when a plurality of microprocessors 15A, 15B exist in the associated controller. Nevertheless, in the present embodiment, since only one microprocessor 15A or 15B exists in both 0-system and 1-system controllers 6A, 6B, the associated controller and the associated microprocessor correspond one-to-one.

The "processing flag" field 43F stores a processing flag for managing the data consistency of the corresponding logical unit. For instance, "host 0-0" shows that processing concerning a zeroth command targeting the corresponding logical unit provided from the host computers 2A, 2B having an identifier of "0" is being executed, and "host 1-0" shows that processing concerning the zeroth command targeting the corresponding logical unit provided from the host computers 2A, 2B having an identifier of "1" is being executed.

Thus, for instance, in the example shown in FIG. 5, the associated controller of the respective logical units having a LUN of "0", "2" and "4" is the 0-system controllers 6A, 6B; the associated microprocessor is the microprocessors 15A, 15B having an identifier of "0"; and the logical unit having a LUN of "0" is currently being subject to processing concerning the zeroth command targeting such logical unit provided from the host computers 2A, 2B having an identifier of "0".

In the example shown in FIG. 5, the associated controller and the associated microprocessor LUN of the respective logical units having a LUN of "1", "3" and "5" are the 1-system controller 6A and the microprocessors 15A, 15B having an identifier of "1" in such controller 6A, and the logical unit having a LUN of "1" is currently being subject to processing concerning a first command targeting the logical unit provided from the host computers 2A, 2B having an identifier of "0".

With the storage system 1, for instance, when a new command other than the "0"th command is given from the host computers 2A, 2B to the logical unit having a LUN of "0" in a state shown in FIG. 5, the processing concerning the new command is not executed until the processing concerning the "0"th command is completed, and the processing concerning the new command is executed after the processing concerning the "0"th command is completed. As a result of this kind of control, it is possible to maintain the consistency of the data I/O processing to the respective logical units when the plurality of host computers 2A, 2B share a logical unit.

Meanwhile, the local memory information tables 44A, 44B are tables for managing the address information and the like required to respectively access the local memory 14A in the 0-system controller 6A and the local memory 14B in the 1-system controller 6B, and, as shown in FIG. 6, are configured from a "memory identifier" field 44C, a "memory address area" field 44D, a "segment block identifier" field 44E, a "top segment address" field 44F, and an "open flag" field 44G.

Among the above, the "memory identifier" field 44A stores a unique identifier given to the corresponding local memories 14A, 14B. Further, the "memory address area" field 44D stores an address area given to each extent in the storage extent provided by the corresponding local memories 14A, 14B. In the foregoing case, the addresses are allocated so that they do not overlap through the storage extents provided by the respective local memories 14A, 14B in the 0-system and 1-system controllers 6A, 6B, and the storage extents provided by the respective cache memories 12A, 12B in the 0-system and 1-system controllers 6A, 6B.

Further, the "segment block identifier" field 44E stores an identifier of each divided area (this is hereinafter referred to as a "segment") formed by dividing the storage extent provided by the corresponding local memories 14A, 14B in prescribed units. These identifiers are allocated so that they do not overlap through each segment defined in the storage extent provided by the respective local memories 14A, 14B in the 0-system and 1-system controllers 6A, 6B, and each segment defined in the respective cache memories 12A, 12B in the 0-system and 1-system controllers 6A, 6B.

Further, the "top segment address" field 44F stores a top address of the corresponding segment, and the "open flag" field 44G stores a flag (this is hereinafter referred to as an "open flag") representing whether data can be written in this segment. Specifically, the "open flag" field 44G stores an open flag ("1") when data can be written in the corresponding segment, and stores "0" when data cannot be written in the segment (when data is already stored therein).

Thus, in the example shown in FIG. 6, the storage extent provided by the local memory 14A in the 0-system controller 6A given an identifier of "LM0" has address areas "LA000" to "LA999", and this storage extent is divided into segments in which the respective top addresses are "LA100", "LA200", . . . . Further, the example illustrated in FIG. 6 shows that, at present, data cannot be written in the segments having an identifier of "a" and "c", and that, at present, data can be written in the segment having an identifier of "b".

Similarly, in the example shown in FIG. 6, the storage extent provided by the local memory 14B in the 1-system controller 6B given an identifier of "LM1" has address areas "LD000" to "LD999", and this storage extent is divided into segments in which the respective top addresses are "LD100", "LD200", . . . . Further, the example illustrated in FIG. 6 shows that, at present, data can be written in the segments having an identifier of "d" and "e", and that, at present, data cannot be written in the segment having an identifier of "f".

Like this, with the storage system 1, by referring to the local memory information tables 44A, 44B, not only can the 0-system and 1-system controllers 6A, 6B acquire information of the self-system local memories 14A, 14B, they will also be able to acquire information of the other-system local memories 14B, 14A. Thus, not only can the microprocessors 15A, 15B and the host communication protocol chips 21A, 21B in the 0-system and 1-system controllers 6A, 6B access the self-system, they will also be able to access the other-system local memories 14B, 14A.

Meanwhile, the cache memory information tables 45A, 45B are tables storing information for respectively accessing the local memory 14A in the 0-system controller 6A and the local memory 14B in the 1-system controller 6B, and, as shown in FIG. 7, are configured from a "memory identifier" field 45C, a "memory address area" field 45D, a "segment block identifier" field 45E, a "top segment address" field 45F, a "time stamp" field 45G, and a "dirty flag" field 45H.

The "memory identifier" field 45C stores a unique identifier given to the corresponding cache memories 12A, 12B. Further, the "memory address area" field 45D stores the address area given to each extent in the storage extent provided by the corresponding cache memories 12A, 12B.

The "segment block identifier" field 45E stores an identifier of each segment in the corresponding cache memories 12A, 12B, and the "top segment address" field 45F stores a top address of the corresponding segment among the foregoing segments.

The "time stamp" field 45G stores a time stamp representing the time that the data was stored in the corresponding segment, and the "dirty flag" field 45H stores a flag (this is hereinafter referred to as "dirty flag") representing whether the data stored in the corresponding segment in the cache memories 12A, 12B has been stored in the storage apparatuses 4A to 4D. Specifically, the "dirty flag" field 45H stores a dirty flag ("1") when such data has already been stored in the storage apparatuses 4A to 4D, and stores "0" when such data has not yet been stored in the storage apparatuses 4A to 4D.

Thus, in the example shown in FIG. 7, the storage extent provided by the cache memory 12A in the 0-system controller 6A given an identifier of "CM0" has address areas "CA000" to "CA999", and this storage extent is divided into segments in which the respective top addresses are "CA100", "CA200", . . . . Further, the example illustrated in FIG. 7 shows that, regarding the segment having an identifier of "A", data stored in such segment has not yet been stored in the storage apparatuses 4A to 4D, and that, regarding the segments having an identifier of "B" and "C", data stored in these segments has already been stored in the storage apparatuses 4A to 4D.

Similarly, in the example shown in FIG. 7, the storage extent provided by the cache memory 12B in the 1-system controller 6B given an identifier of "CM1" has address areas "CB000" to "CB999", and this storage extent is divided into segments in which the respective top addresses are "CB100", "CB200", . . . . Further, the example illustrated in FIG. 7 shows that, regarding the segments having an identifier of "D" and "F", data stored in such segments has not yet been stored in the storage apparatuses 4A to 4D, and that, regarding the segment having an identifier of "E", data stored in this segment has already been stored in the storage apparatuses 4A to 4D.

Like this, with the storage system 1, by referring to the cache memory information tables 45A, 45B, not only can the 0-system and 1-system controllers 6A, 6B acquire information of the self-system cache memory 12A, 12B, they will also be able to acquire information of the other-system cache memory 12B, 12A. Thus, not only can the microprocessors 15A, 15B and the host communication protocol chips 21A, 21B in the 0-system and 1-system controllers 6A, 6B access the self-system, they will also be able to access the other-system cache memories 12B, 12A.

Incidentally, when one of the logical unit/processor association tables 43A, 43B, local memory information tables 44A, 44B and cache memory information tables 45A, 45B stored in the shared areas 42A, 42B (refer to FIG. 3A and FIG. 3B) of the local memories 14A, 14B is changed, such change is also reflected on the other, and processing with consistency between the 0-system and 1-system controllers 6A, 6B is thereby executed.

Further, the configuration may be such that, among the information stored in the local memory information tables 44A, 44B, a first local memory information table (not shown) storing only information concerning the 0-system local memory 14A is stored in the 0-system local memory 14A, and a second local memory information table (not shown) storing only information concerning the 1-system local memory 14B is stored in the 1-system local memory 14B, and, instead, a storage destination address of the first local memory information table is stored in the 1-system local memory 14B, and a storage destination address of the second local memory information table is stored in the 0-system local memory 14A. As a result of adopting the foregoing configuration, it is no longer necessary to redundantly store an open flag in the other-system local memories 14B, 14A in addition to the self-system local memories 14A, 14B each time processing is executed, and this will yield an effect of improving the processing speed and alleviating the processing load.

Similarly, the cache memory information tables 45A, 45B may also be configured such that a first cache memory information table (not shown) storing only information concerning the 0-system cache memory 12A is stored in the 0-system local memory 14A, and a second cache memory information table (not shown) storing only information concerning the 1-system cache memory 12B is stored in the 1-system local memory 14B, and storing only the address information of the respective memories in the other local memory 14B or 14A.

Further, it is also possible to configure the storage destination by giving preference to the area in which the information/data has been updated at the earliest time among the areas capable of storing information/data using a time stamp stored in the "time stamp" field 45G of the cache memory information table 45A, 45B. Thereby, the newly updated data will remain in the cache memories 12A, 12B, and the cache hit ratio will improve.

(1-2-2) Write Command Processing

The specific processing contents of the write command processing in the storage system 1 are now explained with reference to FIG. 8 to FIG. 10. Here, a case is explained where the 0-system controller 6A receives a write command from the host computer 2A.

When the host communication protocol chip 21A of the 0-system controller 6A receives a write command from the host computer 2A (SP1), it refers to the logical unit/processor association table 43A (FIG. 5) and the local memory information table 44A (FIG. 6) stored in the self-system local memory 14A and determines whether the associated microprocessor of the target logical unit is the microprocessor 15A of the self-system (0-system) (SP2).

When the host communication protocol chip 21A obtains a negative result in this determination, it transfers the write command received at step SP1 to the 1-system local memory 14B (SP3). Thereby, this write command will be stored in the control information storage area 41AX (FIG. 3) of the other-system controller receive command storage area 41A (FIG. 3) described above with reference to FIG. 3 in the local memory 14B.

Thereupon, the 0-system communication host protocol chip 21A designates the segment with a raised open flag in the control information storage area 41AX of the 1-system local memory 14B as the write destination and transfers the write command to the 1-system local memory 14B based on the local memory information table 44A stored in the self-system local memory 14A. Thereby, the write command can be transferred between the 0-system and 1-system controllers 6A, 6B without destroying the information in the 1-system local memory 14B.

Meanwhile, the 1-system microprocessor 15B is monitoring the self-system local memory 14B through periodical polling, and, upon recognizing that the write command has been stored in the local memory 14B (SP4), it analyzes this write command and creates a DMA (Direct Memory Access) list 50 (refer to FIG. 8) for storing write data in the self-system cache memory 12B, and stores this in the control information storage area 41AX (FIG. 3) of the other-system controller receive command storage area 41A (FIG. 3) in the self-system local memory 14B (SP5).

Upon creating this DMA list 50, the cache memory information table 45B (FIG. 7) stored in the local memory 14B is referred to, and a top address of the segment in which the dirty flag is 0 and the time stamp is oldest is designated as the data storage destination address. Here, the 1-system microprocessor 15B stores a dirty flag (stores "1") in the "dirty flag" field 45H (FIG. 7) corresponding to the segment in the cache memory information table 45B stored in the self-system local memory 14B.

Subsequently, the 1-system microprocessor 15B sets a register of the host communication protocol chip 21A in the 0-system controller 6A so as to boot the host communication protocol chip 21A, and commands the host communication protocol chip 21A to perform data transfer according to the DMA list 50 created at step SP5 (SP6).

The 0-system host communication protocol chip 21A that received the command reads the DMA list 50 from the 1-system local memory 14B (SP7). Further, the host communication protocol chip 21A receives the write data sent from the host computer 2A and stores it in the self-system cache memory 12A based on the DMA list 50, and executes processing for notifying the DMA address to the self-system data transfer control unit 11A (SP8).

When the 0-system data transfer control unit 11A is notified of the DMA address from the self-system host communication protocol chip 21A as described above, it reads the write data stored in the self-system cache memory 12A and transfers such write data to the 1-system controller 6B. As a result, this write data is also stored in the cache memory 12B of the 1-system controller 6B, and the write data is duplicated (SP9).

Further, when the duplication of the write data is completed, the 0-system host communication protocol chip 21A sends a notice to the 1-system microprocessor 15B that the data transfer (duplication) is complete (this is hereinafter referred to as a "data transfer completion notice") using an MSI (Message Signal Interrupt), which is a PCI Standard interrupt notice function (SP10). As a result of using MSI as the method of sending a notice from the host communication protocol chip 21A to the microprocessor 15B, the communication processing between the self-system and other-system controllers 6A, 6B will no longer be required, and the deterioration in the system performance can be prevented.

When the 1-system microprocessor 15B receives the data transfer completion notice, it issues a command to the 0-system host communication protocol chip 21A for sending a notice to the effect that the write command processing is complete to the corresponding host computer 2A. The 0-system host communication protocol chip 21A that received this command sends a report to the effect that the writing of write data is complete to the host computer 2A that sent the write command (SP11).

Subsequently, the 1-system microprocessor 15B migrates (destages) the write data stored in the self-system cache memory 12B to the logical volume LU1 designated in the corresponding storage apparatuses 4A to 4D, and sets the dirty flag stored in the corresponding "dirty flag" field 45H of the cache memory information table 45B stored in the self-system local memory 14B to "0" (SP12).

Meanwhile, when the 0-system host communication protocol chip 21A obtains a positive result in the determination at step SP2, it stores the write command in the self-system controller receive command storage area 40A (FIG. 3) of the self-system local memory 14A (SP13). As a result, the write command stored in the local memory 14A will eventually be recognized by the 0-system microprocessor 15A through periodical polling (SP14).

When the microprocessor 15A recognizes that the write command has been given, it analyzes the write command, creates a DMA list 50 (FIG. 8) storing an address of the cache memory 12A to which the write data is to be written and the data length of the write data for storing the corresponding write data in the self-system cache memory 12A, and stores this in the self-system controller receive command storage area 40A (FIG. 3) of the self-system local memory 14A (SP15).

Upon creating this DMA list 50, the cache memory information table 45A stored in the local memory 14A is referred to, and a top address of the segment in which the dirty flag is 0 and the time stamp is oldest is designated as the data storage destination address. Here, the 0-system microprocessor 15A stores a dirty flag (stores "1") in the "dirty flag" field 45H (FIG. 7) corresponding to the segment in the cache memory information table 45A stored in the self-system local memory 14A.

Subsequently, the 0-system microprocessor 15A boots the self-system host communication protocol chip 21A, and commands the host communication protocol chip 21A to perform data transfer according to the DMA list 50 created at step SP15 (SP16).

Thereby, the 0-system host communication protocol chip 21A reads the DMA list 50 from the self-system local memory 14A (SP17). Further, the host communication protocol chip 21A receives the write data sent from the host computer 2A and stores it in the self-system cache memory 12A based on the DMA list 50, and executes processing for notifying the DMA address to the self-system data transfer control unit 11A (SP18).

When the 0-system data transfer control unit 11A is notified of the DMA address from the self-system host communication protocol chip 21A as described above, it reads the write data stored in the self-system cache memory 12A and transfers such write data to the 1-system controller 6B. As a result, this write data is also stored in the cache memory 12B of the 1-system controller 6B, and the write data is duplicated (SP19).

The 0-system microprocessor 15A issues a command to the self-system host communication protocol chip 21A for sending a notice to the effect that the write command processing is complete to the corresponding host computer 2A. The 0-system host communication protocol chip 21A that received this command sends a report to the effect that the writing of write data is complete to the corresponding host computer 2A (SP20).

Subsequently, the 0-system microprocessor 15A migrates (destages) the write data stored in the self-system cache memory 12A to the logical volume LU1 designated in the corresponding storage apparatuses 4A to 4D, and sets the dirty flag stored in the corresponding "dirty flag" field 45H of the cache memory information table 45A stored in the self-system local memory 14A to "0" (SP21).

Incidentally, during this kind of write command processing, when the 0-system and 1-system microprocessors 15A, 15B are to store information in the self-system local memory 14A or the other-system local memory 14B, the set the open flag stored in the corresponding "open flag" field 44G of the corresponding local memory information tables 14A, 14B to "0", and thereafter set the open flag to "1" when such information is not longer required in the subsequent processing.

Although a case was explained above where the 0-system controller 6A received a write command from the host computer 2A, the same applies when the 1-system controller 6B receives a write command from the host computer 2B.

(1-2-3) Read Command Processing

The read command processing in the storage system 1 is now explained with reference to FIG. 11 to FIG. 13. Here, a case is explained where the 0-system controller 6A receives a read command from the host computer 2A.

When the host communication protocol chip 21A of the 0-system controller 6A receives a read command from the host computer 2A (SP30), it refers to the logical unit/processor association table 43A (FIG. 5) and the local memory information table 44A stored in the self-system local memory 14A and determines whether the associated microprocessor of the target logical unit is the microprocessor 15A of the self-system (0-system) (SP31).

When the host communication protocol chip 21A obtains a negative result in this determination, it transfers the read command received at step SP31 to the 1-system local memory 14B (SP32). Thereby, this read command will be stored in the control information storage area 41AX (FIG. 3) of the other-system controller receive command storage area 41A (FIG. 3) described above with reference to FIG. 3 in the local memory 14B.

Thereupon, the 0-system communication host protocol chip 21A designates the segment with a raised open flag in the control information storage area 41AX of the 1-system local memory 14B as the write destination and transfers the read command to the 1-system local memory 14B based on the local memory information table 44A stored in the self-system local memory 14A. Thereby, the read command can be transferred between the 0-system and 1-system controllers 6A, 6B without destroying the information in the 1-system local memory 14B.

Meanwhile, the 1-system microprocessor 15B is monitoring the self-system local memory 14B through periodical polling, and, upon recognizing that the read command has been stored in the local memory 14B (SP33), it analyzes this read command and determines whether the target read data exists in the 1-system cache memory 12B.

The microprocessor 15B proceeds to step SP38 when such read data exists in the cache memory 12B, and reads the read data from the corresponding storage apparatuses 4A to 4D and stores (stages) the read data in the cache memory 12B when such read data does not exist in the cache memory 12B (SP34).

The read data stored in the cache memory 12B is thereafter transferred to the 0-system controller 6A with the 1-system data transfer control unit 11B, and stored in the data storage area 50AY (FIG. 4) of the cache memory 12A in the controller 6A. The read data is thereby subject to dual writing (SP35).

Further, although the management information of this read data is also stored in the data management information storage area 50B (FIG. 4B) of the self-system cache memory 12B with the 1-system microprocessor 15B (SP36), the management information is also transferred to the 0-system cache memory 12A, and stored in the data management information storage area 50A of the cache memory 12A. The management information of the read data is thereby also subject to dual writing (SP37).

Subsequently, the 1-system microprocessor 15B creates the DMA list 50 (FIG. 8) with the same method as the foregoing method described with reference to step SP5 of FIG. 9, and stores the created DMA list 50 in the self-system local memory 14B (SP38). The microprocessor 15B also boots the 0-system host communication protocol chip 21A and uses MSI to command the host communication protocol chip 21A to perform data transfer according to the DMA list 50 created at step SP38 (SP39).

The 0-system host communication protocol chip 21A that received the command reads the DMA list 50 from the 1-system local memory 14B (SP40), and notifies the required DMA address to the self-system data transfer control unit 11A based on the DMA list 50 (SP41). Further, the data transfer control unit 11A that received the notice transfers the management information of the read data to the self-system host communication protocol chip 21A according to the provided DMA address.

Meanwhile, the 0-system host communication protocol chip 21A that received the management information confirms the guarantee code and confirms that the data is read data based on such management information (SP42), and thereafter transfers the read data from the self-system cache memory 12A to the self-system host communication protocol chip 21A (SP43). Incidentally, the read data can also be sent from the 1-system cache memory 12B. The host communication protocol chip 21A thereafter sends this read data to the corresponding host computer 2A (SP44).

Meanwhile, when the 0-system host communication protocol chip 21A obtains a positive result in the determination at the foregoing step SP31, it stores the read command in the self-system controller receive command storage area 40A (FIG. 3) of the self-system local memory 14A (SP45). As a result, the read command stored in the local memory 14A will be eventually recognized by the 0-system microprocessor 15A through periodical polling (SP46).

Figure 12:
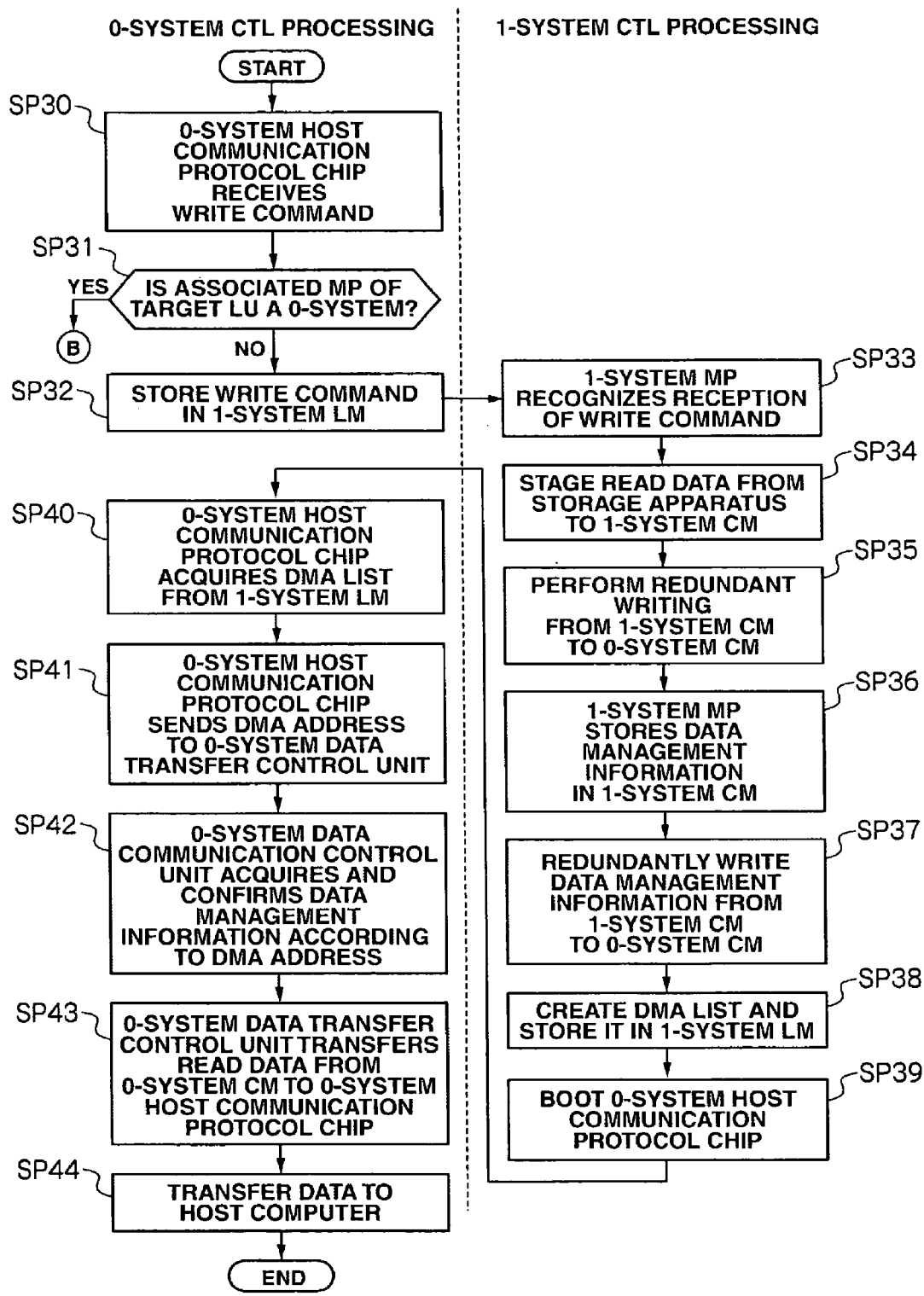
FIG. 12 is a flowchart explaining read command processing in a storage system according to an embodiment of the present invention.

Subsequently, the same processing as the processing described with reference to step SP34 to step SP44 of FIG. 12 is performed in the first controller 6A, and the read data designated by the read command is thereby read from the corresponding logical unit and sent to the host computer 2A (SP47 to SP57).

Incidentally, although a case was explained above where the 0-system controller 6A received a read command from the host computer 2A, the same applies when the 1-system controller 6B receives a read command from the host computer 2B.

(1-2-4) Arbitration Function in Data Transfer Control Unit and Bridge

The arbitration function loaded in the data transfer control units 11A, 11B and the bridges 13A, 13B is now explained.

As described with reference to FIG. 1, with the storage system 1 according to the present embodiment, in the respective controllers 6A, 6B of the 0-system and 1-system, the host communication control units 10A, 10B, the cache memories 12A, 12B, the bridges 13A, 13B and the storage apparatus communication control units 16A, 16B are connected to the data transfer control units 11A, 11B via a prescribed bus, and a bus configuring the inter-controller connection path 5 is also connected thereto. Further, in the respective controllers 6A, 6B of the 0-system and 1-system, the local memories 14A, 14B, the microprocessors 15A, 15B and the data transfer control units 11A, 11B are connected to the bridges 13A, 13B via a prescribed bus. Thus, transfer requests of various commands are given to the data transfer control units 11A, 11B and the bridges 13A, 13B via the respective buses.

Thus, when transfer requests of a plurality of commands are given to the data transfer control units 11A, 11B and the bridges 13A, 13B, the processing in response to such transfer requests is performed in the order that the requests had arrived. Further, when a plurality of transfer requests arrive simultaneously to the data transfer control units 11A, 11B and the bridges 13A, 13B, transfer processing is performed in order from the command with the highest priority.

Here, with the storage system 1 according to the present embodiment, as commands that pass through the data transfer control units 11A, 11B and the bridges 13A, 13B, there are various commands to be given to the respective elements in the self-system controllers 6A, 6B from the microprocessors 15A, 15B, refresh commands to the local memories 14A, 14B, access commands to the cache memories 12A, 12B given from the other-system controllers 6B, 6A via the inter-controller connection path 5, and various commands concerning the DMA as described above, the priority of these commands is set forth in order in consideration of various circumstances.

Thus, with the storage system 1, if no measure is taken, as a result of high priority requests being sequentially given to the data transfer control units 11A, 11B and the bridges 13A, 13B, transfer of the transfer processing to commands concerning the DMA set with a low priority will be put on hold continuously.

Therefore, with the storage system 1 of this embodiment, the data transfer control units 11A, 11B and the bridges 13A, 13B are equipped with an arbitration function for evenly processing the requests from the bus, and it is thereby possible to prevent the transfer requests of various commands concerning the DMA set with a low priority as described from being put on hold continuously even when high priority requests are sequentially given to the data transfer control units 11A, 11B and the bridges 13A, 13B.

(1-3) Effect of Present Embodiment

As described above, with the storage system 1 according to the present embodiment, when the 0-system controller 6A receives a write command or a read command targeting a logical unit with the 1-system controller 6B as the associated controller, the 0-system microprocessor 15A transfers and directly writes such write command or read command to and in the 1-system local memory 14B. Thus, communication between the 0-system and 1-system microprocessors 15A, 15B will no longer be required upon the transfer of the foregoing write command or read command between the 0-system and 1-system controllers 6A, 6B.

Accordingly, with this storage system 1, it is possible to effectively prevent an unnecessary load from arising in the controller that received the command based on the communication, and a delay in the processing time in response to the command. It is also possible to speed up the processing time in response to the command while reducing the load on the controller that received the command targeting a non-associated logical volume.

Further, with the storage system 1 of this embodiment, since the write command and read command are written in the self-system local memory 15B with a relatively fast access speed, for instance, it is possible to yield an effect of improving the processing speed in comparison to cases of exchanging the write command and read command via the cache memory 12B with a relatively slow access speed. Further, since sequential processing can be primarily performed by the 1-system microprocessor 15B with the intervention of the 0-system microprocessor 15A, for instance, even in cases where the processing load of the 0-system microprocessor 15A is high and the processing load of the 1-system microprocessor 15B is low, it is possible to avoid a situation where the response deteriorates due to the processing load of the 0-system microprocessor 15A becoming a bottleneck.

Moreover, with the storage system 1 of this embodiment, the 0-system controller 6A or the 1-system controller 6B that received the write command or read command from the host computers 2A, 2B will not have to newly create a job for requesting the processing to the other-system controllers 6B, 6A. Thus, whether the 0-system controller 6A or the 1-system controller 6B receives a command sent from the host computers 2A, 2B, the processing can be executed at roughly the same processing efficiency.

Thereby, with this storage system 1, it is no longer necessary to make the host computers 2A, 2B recognize the associated controller of the target logical unit, and, even when the 0-system controllers 6A, 6B receive write commands and read commands from numerous host computers 2A, 2B, it is possible to respond to such commands with a high processing speed. Thus, it is possible to improve the freedom of configuration and reduce maintenance work. For example, when the associated logical unit is to be dynamically switched according to the load status between the 0-system and 1-system microprocessors 15A, 15B, it is possible to prevent the deterioration in processing efficiency even when the process of setting the controllers 6A, 6B of the destination for realizing an appropriate load balance of the host computers 2A, 2B is not performed.

Figure 14:
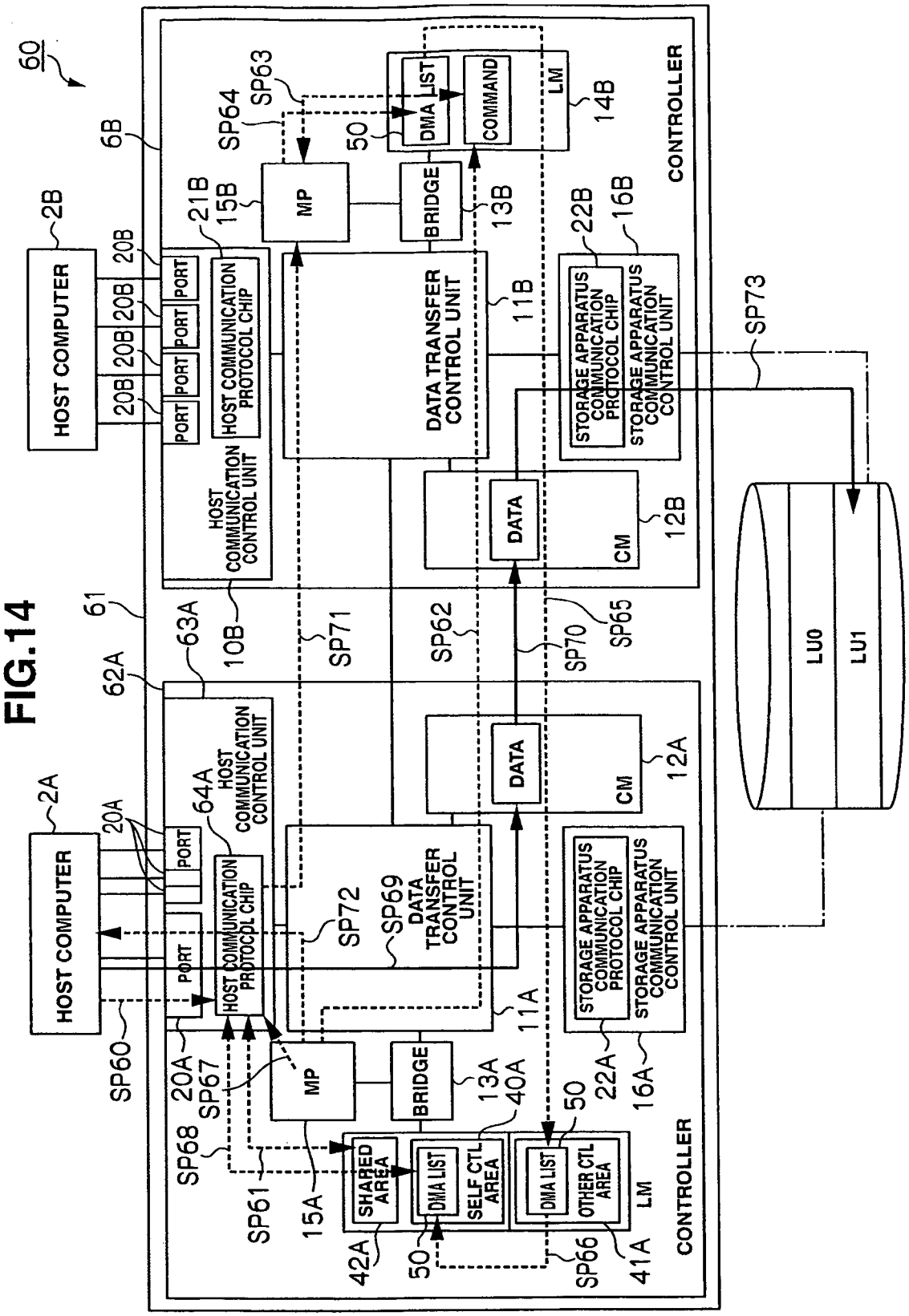
FIG. 14 is a block diagram explaining write command processing in a storage system according to another embodiment of the present invention.

(2) Second Embodiment (2-1) Write Command Processing and Read Command Processing in Present Embodiment FIG. 14 shows a storage system 60 according to the second embodiment. This storage system 60 is configured the same as the storage system 1 (FIG. 1) according to the first embodiment other than that the host communication protocol chip 63A provided in the host communication control unit 63A of the 0-system controller 62A configuring the storage controller 61 is not equipped with a multi CPU support function, and is only able to communicate data with a single microprocessor.

Figure 15:
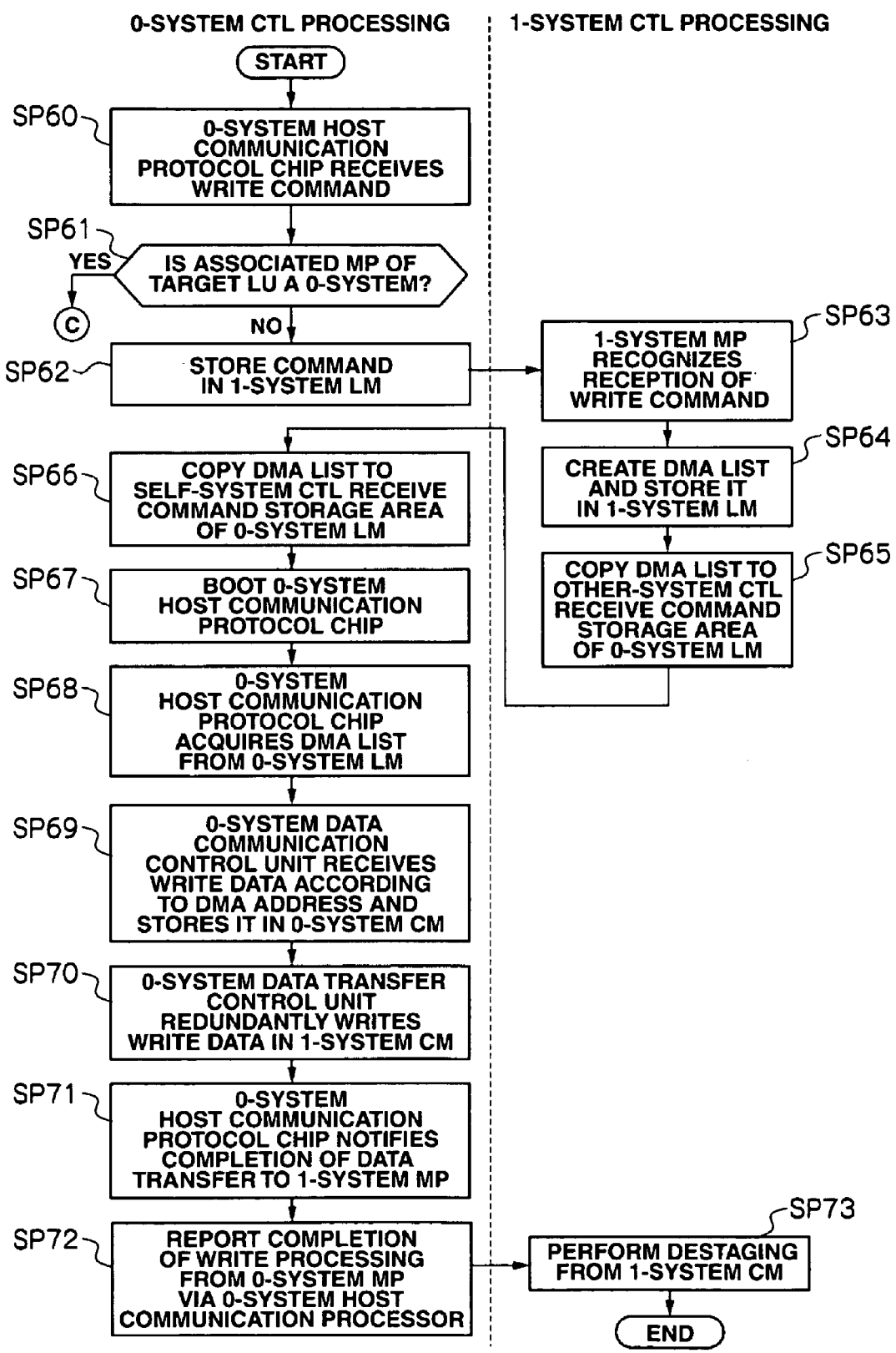
FIG. 15 is a flowchart explaining write command processing in a storage system according to another embodiment of the present invention.
Figure 16:
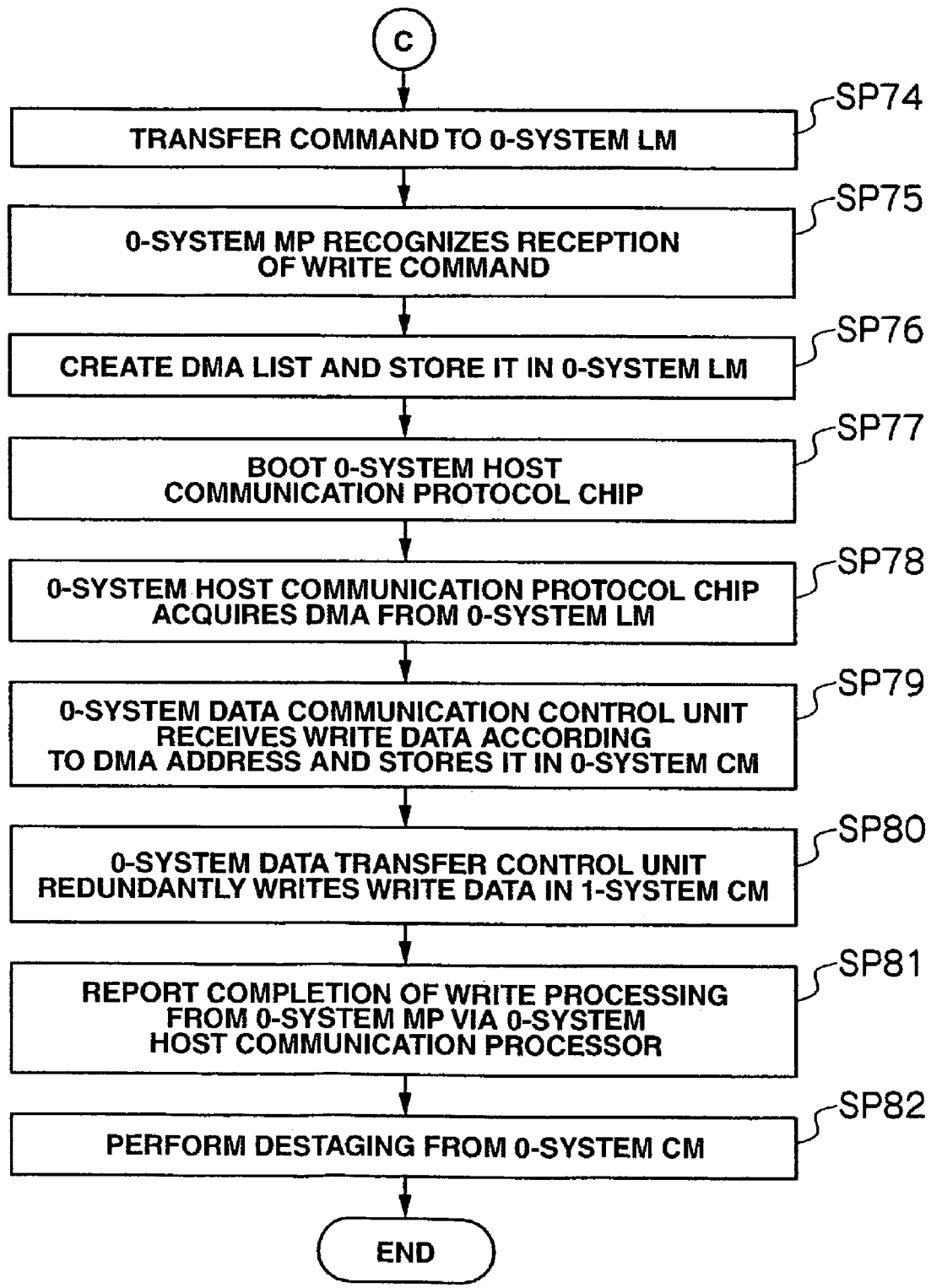
FIG. 16 is a flowchart explaining write command processing in a storage system according to another embodiment of the present invention.

FIG. 14 to FIG. 16 are flowcharts showing the flow of the write command processing in the storage system 60. Here, as with the first embodiment, a case is explained where the 0-system controller 62A receives a write command from the host computer 2A.

Figure 8:
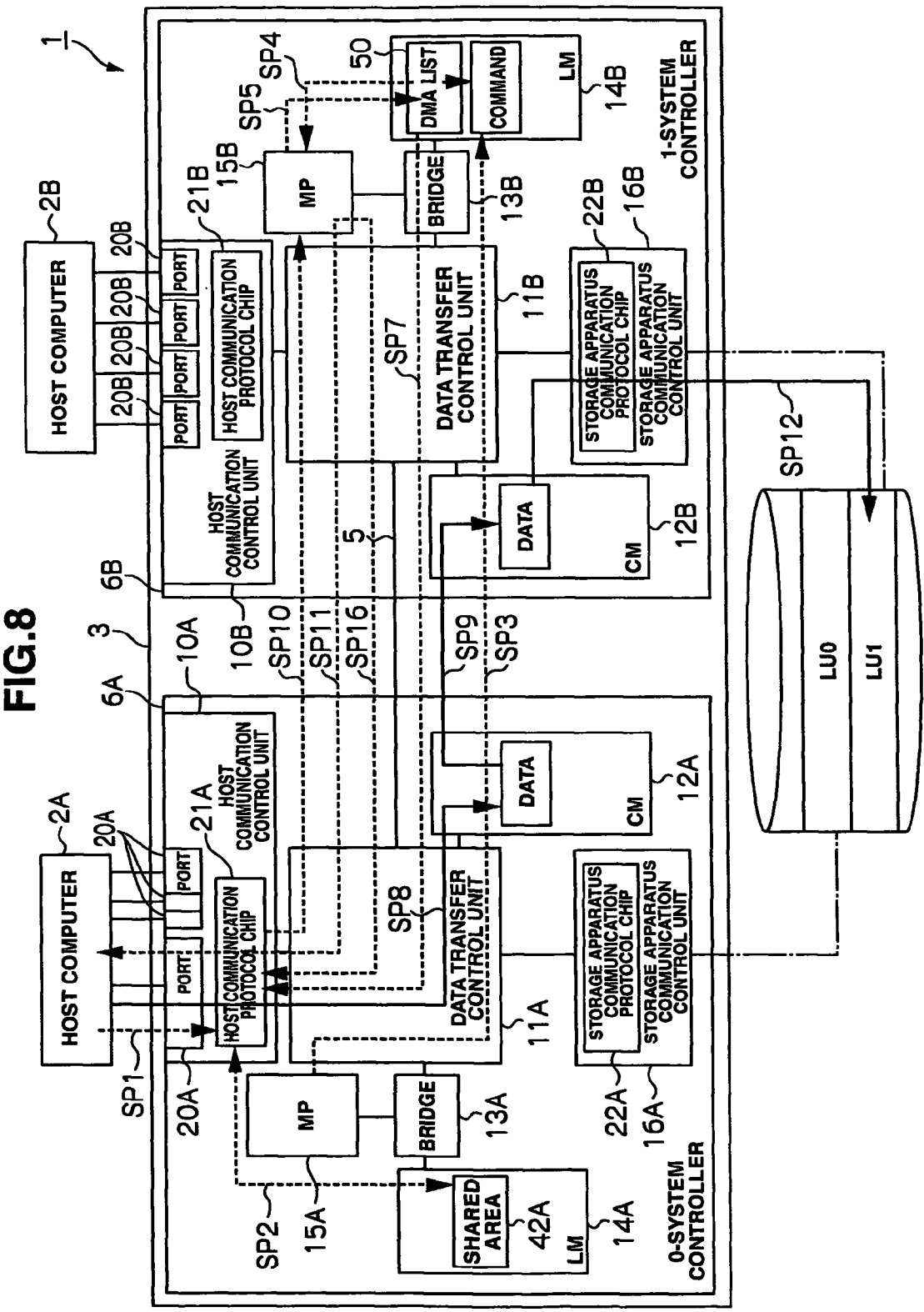
FIG. 8 is a block diagram explaining write command processing in a storage system according to an embodiment of the present invention.
Figure 9:
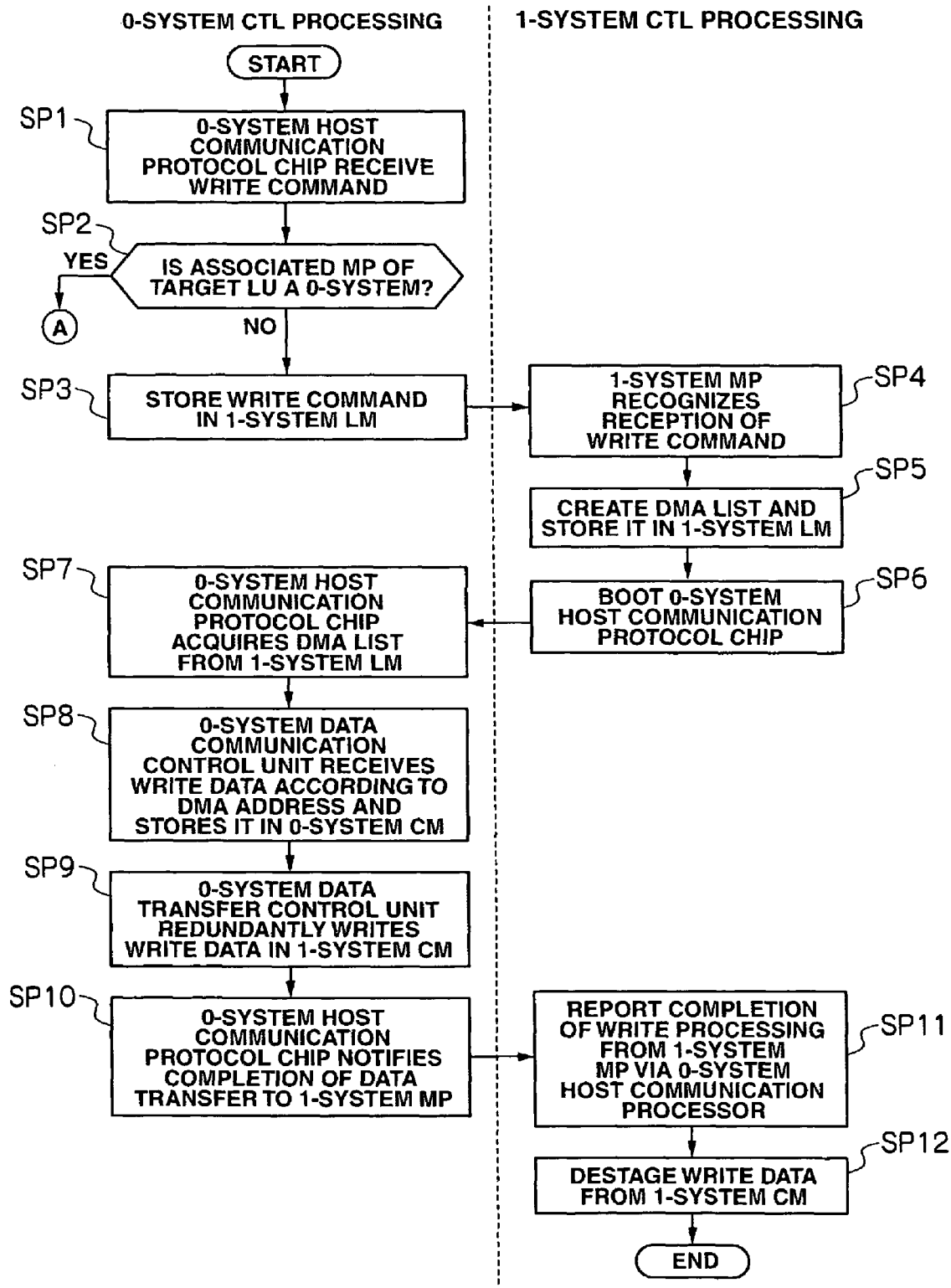
FIG. 9 is a flowchart explaining write command processing in a storage system according to an embodiment of the present invention.
Figure 10:
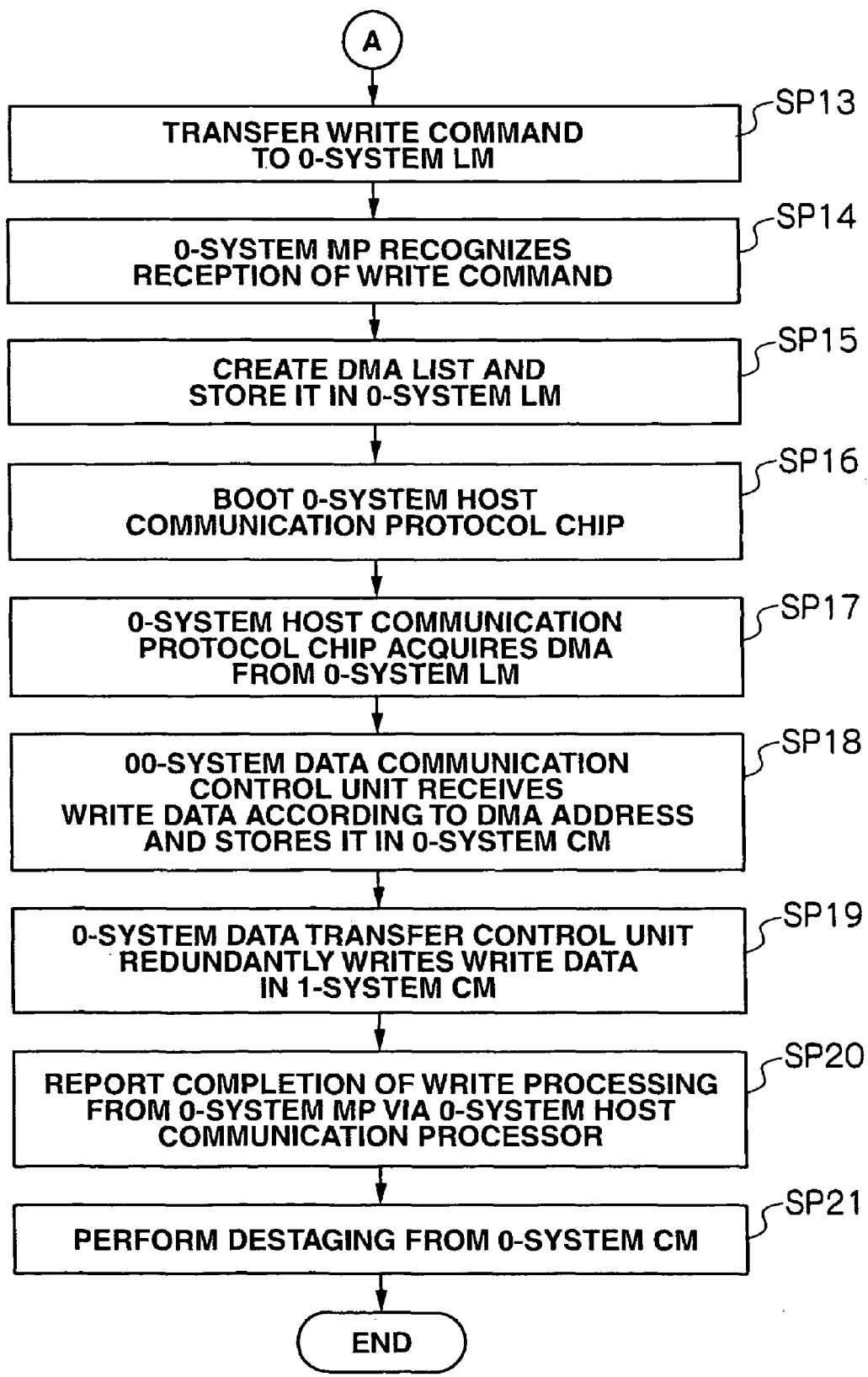
FIG. 10 is a flowchart explaining write command processing in a storage system according to an embodiment of the present invention.

In the foregoing case, with the storage system 60, as with step SP1 to step SP5 of FIG. 8 to FIG. 10, the write command given from the host computer 2A to the 0-system controller 62A is provided to the 1-system controller 6B, and the DMA list 50 is created in the 1-system controller 6B and stored in the 1-system local memory 14B based on this write command (SP60 to SP64).

The 1-system microprocessor 15B thereafter copies the DMA list 50 stored in the 1-system local memory 14B to the 0-system local memory 14A. Thereupon, the 1-system microprocessor 15B refers to the local memory information table 44B (FIG. 6) and designates the control information storage area 41AX (FIG. 3) in the other controller receive command storage area 41A of the 0-system local memory 14A as the copy destination of the DMA list 50 (SP65). This is because the 0-system microprocessor 15A boots the 0-system host communication protocol chip 64A so as to read the DMA list 50.

Meanwhile, the 0-system microprocessor 15A is monitoring the self-system local memory 14A through periodical polling, and, upon recognizing that the DMA list 50 has been stored in the local memory 14A, it copies this DMA list 50 to the control information storage area 40AX in the self controller storage receive area 40A of the local memory 14A (SP66).

Further, the microprocessor 15A thereafter boots the self-system host communication protocol chip 64A, and commands the host communication protocol chip 64A to perform the data transfer according to the DMA list 50 (SP67).

The host communication protocol chip 64A that received the command reads the DMA list 50 stored in the control information storage area 40AX of the self controller storage receive area 40A in the self-system local memory 14A, and notifies the DMA address to the self-system data transfer control unit 11A (SP68).

When the 0-system data transfer control unit 11A is notified of the DMA address from the self-system host communication protocol chip 21A as described above, it receives the write data from the host computer 2A according to this DMA address, and stores this in the self-system cache memory 12A (SP69).

Further, the 0-system data transfer control unit 11A transfers the write data stored in the self-system cache memory 12A to the 1-system controller 6B. As a result, this write data is also stored in the cache memory 12B of the 1-system controller 6B, and the write data is thereby duplicated (SP70). Moreover, when the duplication of the write data is complete, the 0-system host communication protocol chip 21A sends a data transfer completion notice to the 1-system microprocessor 15B through the data transfer control unit 11A, and uses the data transfer control unit 11A to create and send the foregoing MSI (SP71).

Subsequently, the 0-system microprocessor 15A issues a command to the self-system host communication protocol chip 64A for sending a notice to the effect that the write command processing is complete to the corresponding host computer 2A. The 0-system host communication protocol chip 64A that received this command sends a report to the effect that the writing of write data is complete to the host computer 2A that sent the write command (SP72).

Subsequently, the 1-system microprocessor 15B migrates (destages) the write data stored in the self-system cache memory 12B to the logical volume LU1 designated in the corresponding storage apparatuses 4A to 4D, and sets the dirty flag stored in the corresponding "dirty flag" field 45H of the cache memory information table 45B stored in the self-system local memory 14B to "0" (SP73).

Meanwhile, when the 0-system host communication protocol chip 64A obtains a positive result in the determination at step SP61, it migrates (destages) the write data from the host computer 2A to the logical volume LU1 designated in the corresponding storage apparatuses 4A to 4D according to the same routine as step SP13 to step SP2 of FIG. 10 (step SP74 to step SP82).

Incidentally, although a case was explained above where the 0-system controller 62A received a write command from the host computer 2A, the same applies when the 1-system controller 6B receives a write command from the host computer 2B.

Figure 17:
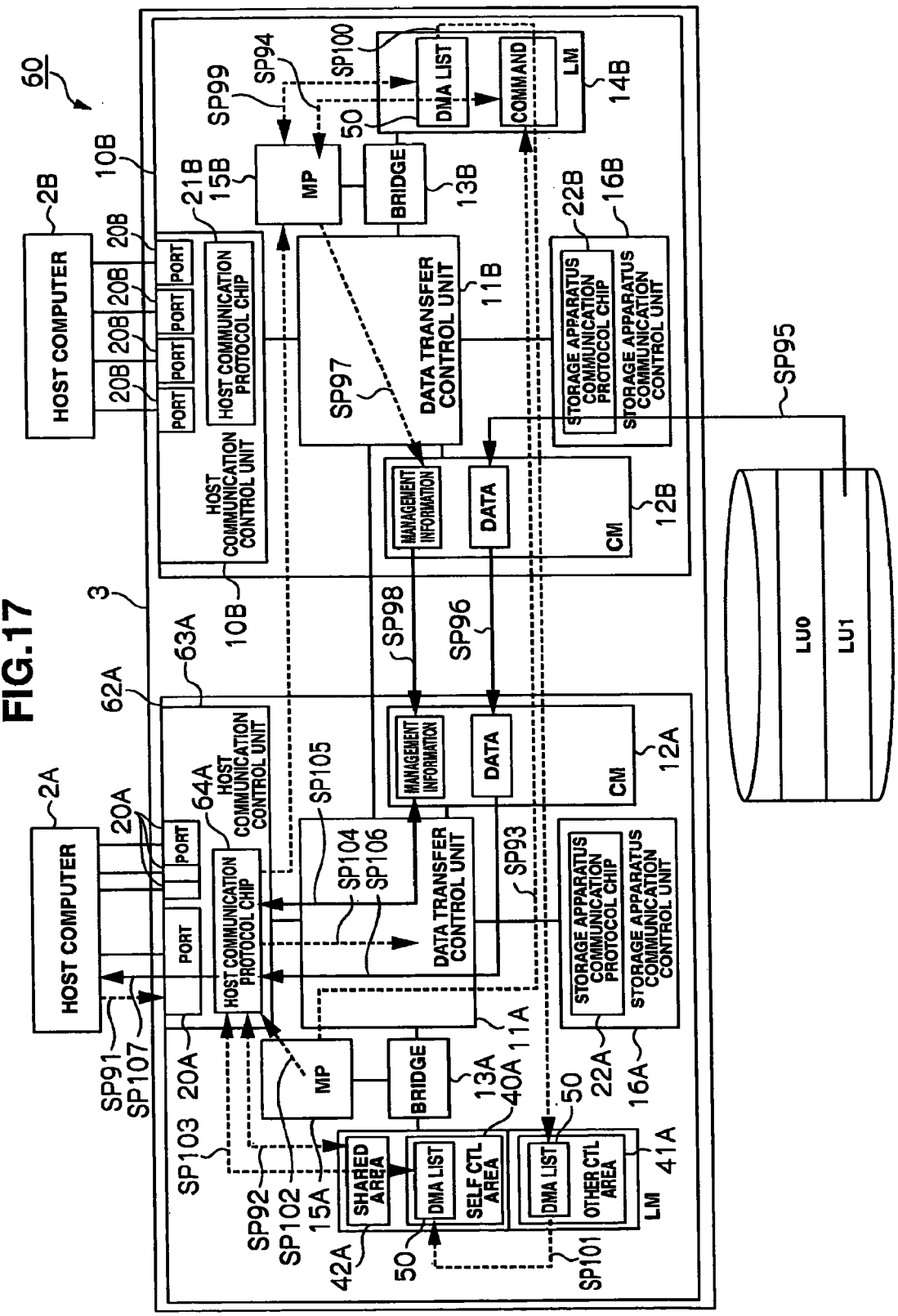
FIG. 17 is a block diagram explaining read command processing in a storage system according to another embodiment of the present invention.
Figure 18:
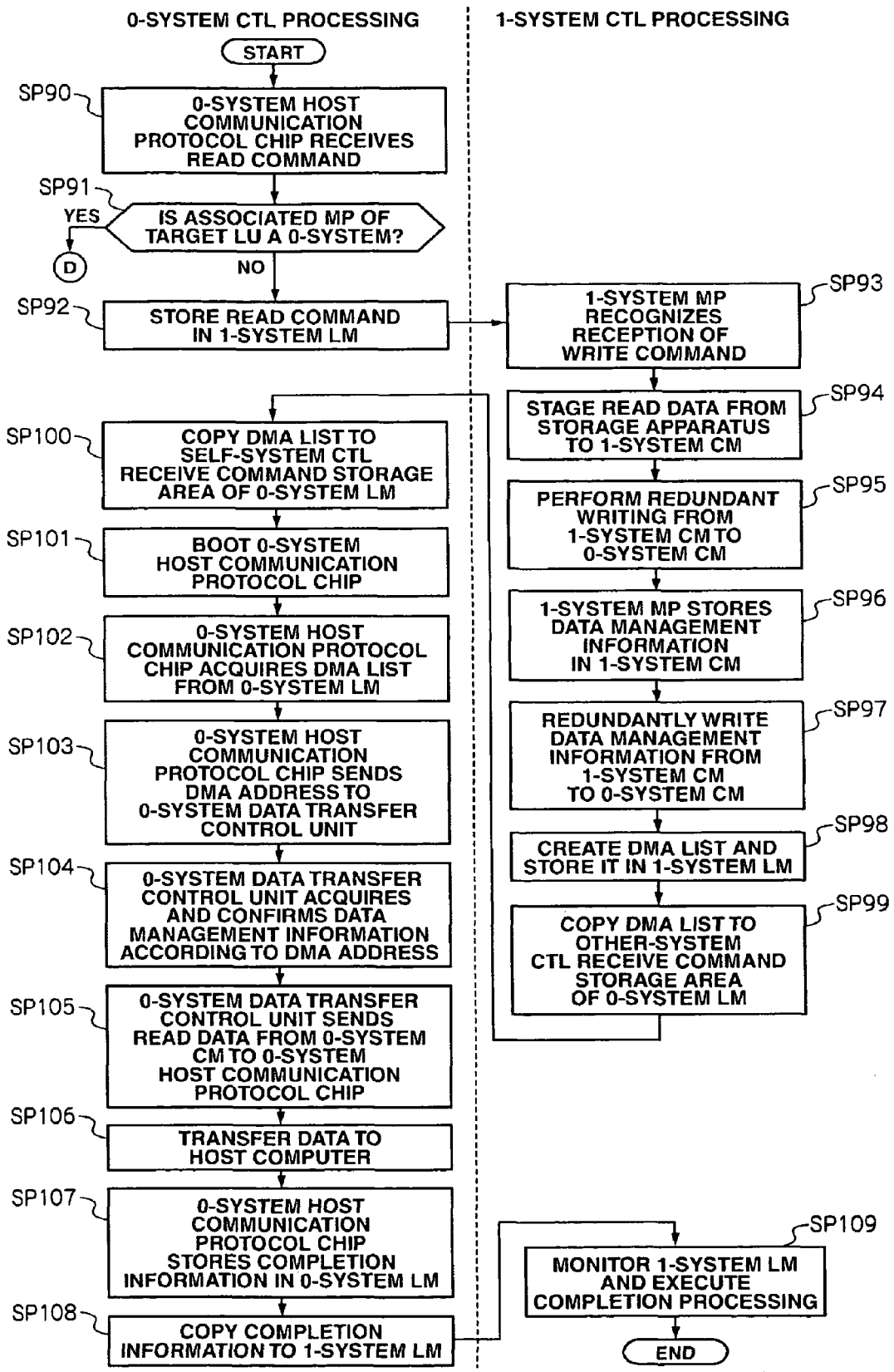
FIG. 18 is a flowchart explaining read command processing in a storage system according to another embodiment of the present invention.
Figure 19:
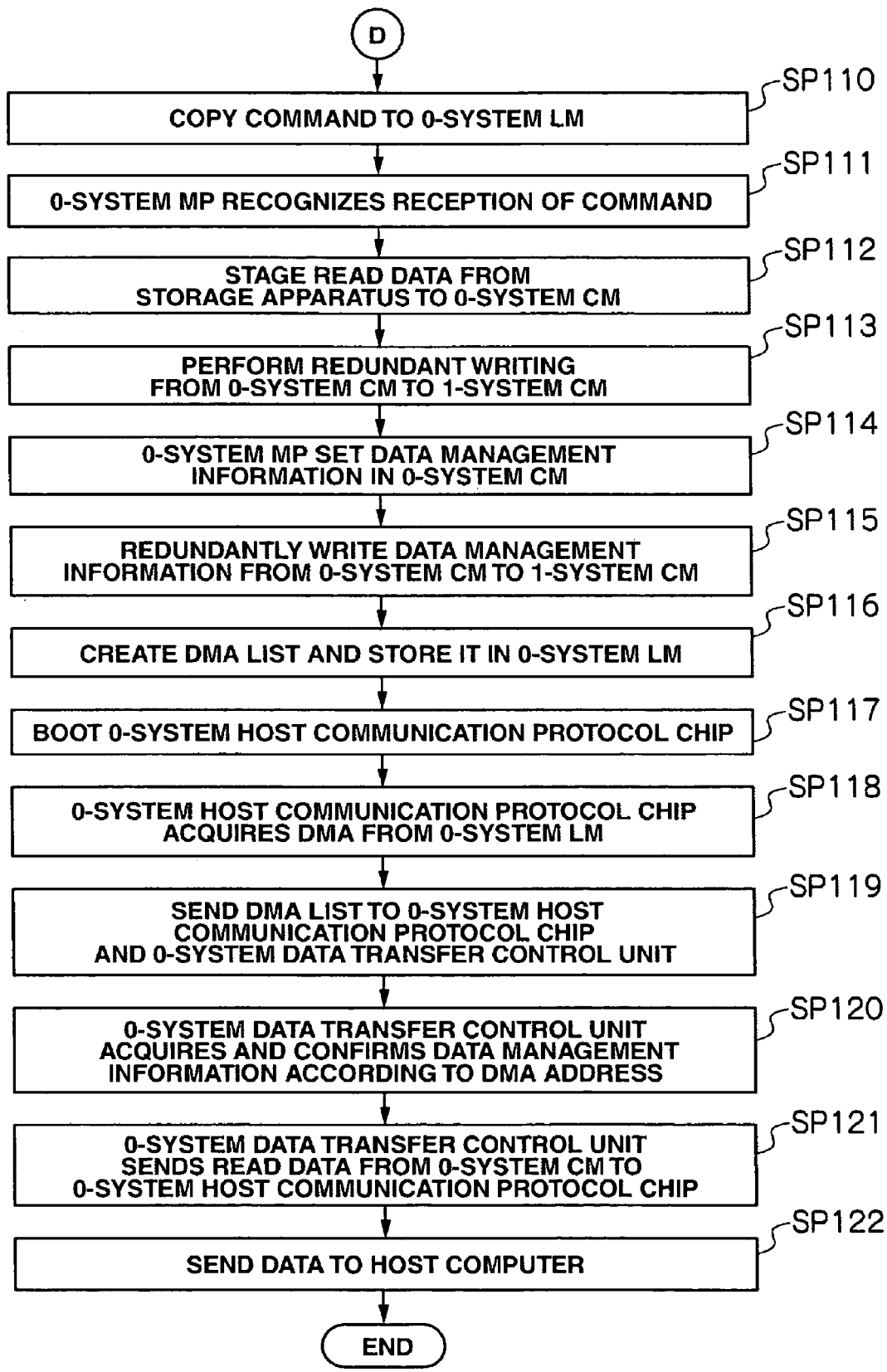
FIG. 19 is a flowchart explaining read command processing in a storage system according to another embodiment of the present invention.

Meanwhile, FIG. 17 to FIG. 19 are flowcharts showing the flow of the read command processing in the storage system 60. Here, as with the first embodiment, a case is presumed where the 0-system controller 62A receives a read command from the host computer 2A.

Figure 11:
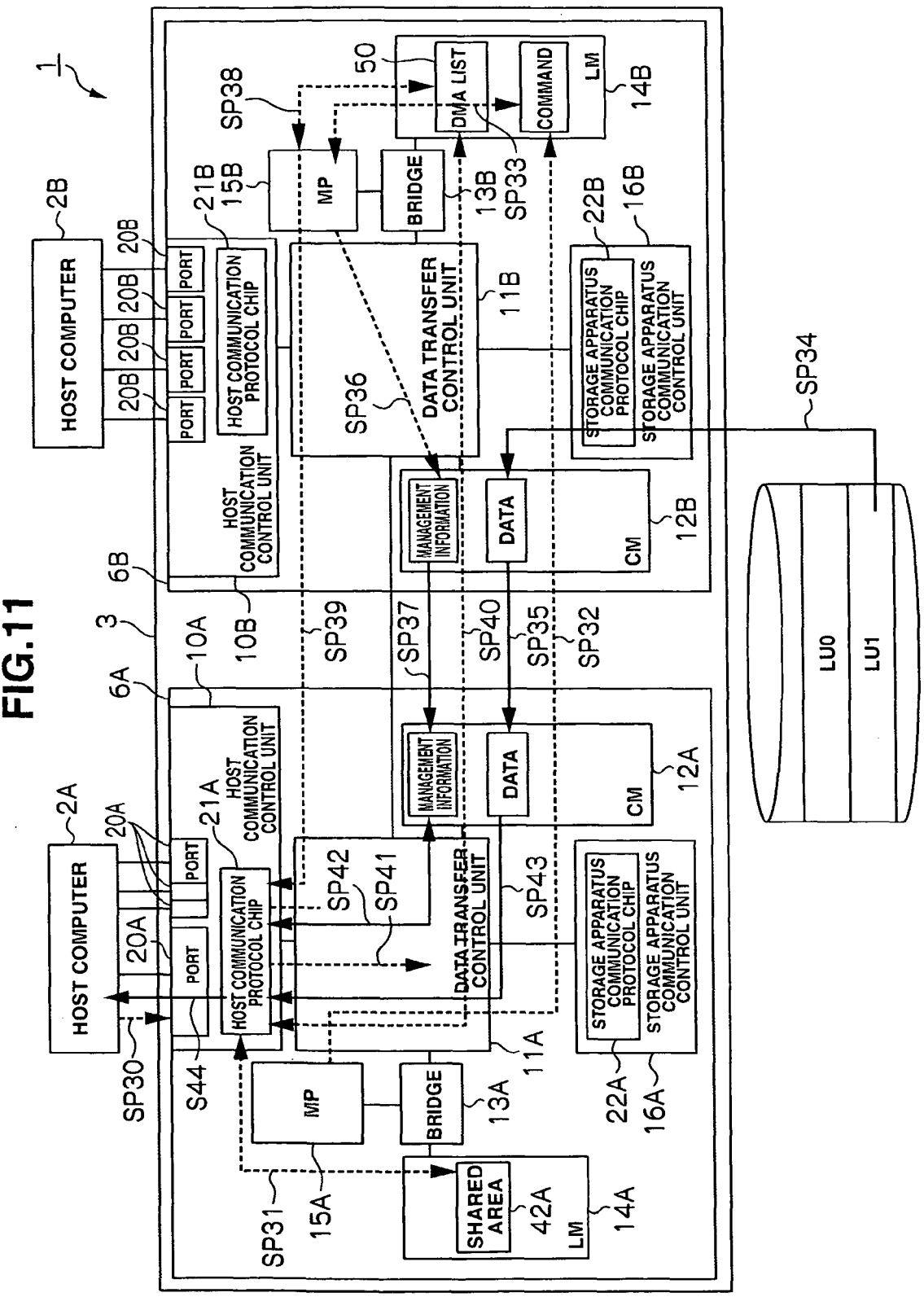
FIG. 11 is a flowchart explaining read command processing in a storage system according to an embodiment of the present invention.
Figure 13:
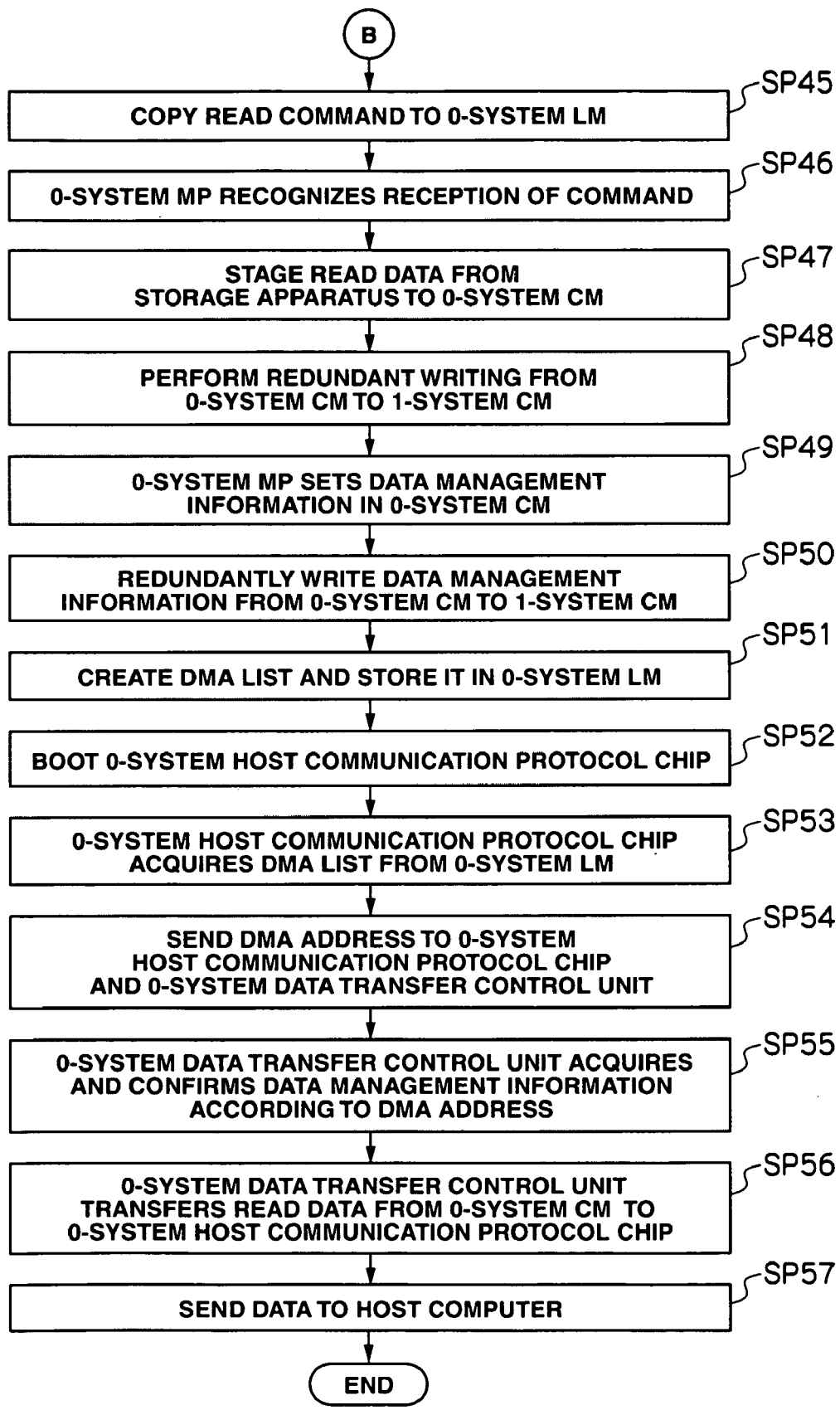
FIG. 13 is a flowchart explaining read command processing in a storage system according to an embodiment of the present invention.

In the foregoing case, with the storage system 60, as with step SP30 to step SP38 of FIG. 11 to FIG. 13, the read data according to the read request from the host computer 2A is staged from the storage apparatuses 4A to 4D to the 1-system cache memory 12B, and this read data and its management information are dual written in the 0-system and 1-system cache memories 12A, 12B. Further, with the storage system 60, the DMA list 50 in relation to this read data is created in the 1-system controller 21, and stored in the 1-system local memory 14B (SP90 to SP98).

Subsequently, the 1-system microprocessor 15B transfers the DMA list 50 stored in the local memory 14B to the 0-system local memory 14A. As a result, the DMA list 50 is stored in the control information storage area 41AX of the other-system controller receive command storage area 41A in the 0-system local memory 14A described above with reference to FIG. 3 (SP99).

The DMA list 50 stored in the 0-system local memory 14A is thereafter copied to the control information storage area 40AX (FIG. 3) of the self-system controller receive command storage area 40A in the local memory 14A (SP100).

Subsequently, the 0-system microprocessor 15A boots the 0-system host communication protocol chip 21A (SP101), and commands the host communication protocol chip 21A to perform the data transfer according to the DMA list 50 created at step SP98 (SP101).

The 0-system host communication protocol chip 64A that received the command reads the DMA list 50 from the control information storage area 40AX in the self-system controller receive command storage area 40A (FIG. 3) of the self-system local memory 14A (SP102), and notifies the DMA address to the self-system data transfer control unit 1A based on the DMA list 50 (SP103).

Further, the data transfer control unit 11A that received the notice transfers the management information of the read data to the self-system host communication protocol chip 64A according to the provided DMA address. The 0-system data transfer control unit 11A thereafter acquires the data management information according to the sent DMA address and checks the consistency thereof (SP104).

Subsequently, the 0-system data transfer control unit 11A transfers the read data from the 0-system cache memory 12A to the self-system host communication protocol chip 64A (SP105), and the host communication protocol chip 21A thereafter sends this read data to the corresponding host computer 2A (SP106). Further, when the transfer of the read data to the host computer 2A is complete, the 0-system host communication protocol chip 64A stores completion information in the self-system local memory 14A (SP107).

Subsequently, the 0-system host communication protocol chip 64A copies the completion information to the 1-system local memory 14B (SP108), and the microprocessor 15B monitoring the local memory 14B is subject to the completion processing of this completion information by the local memory 14B (SP109).

Meanwhile, when the 0-system host communication protocol chip 21A obtains a positive result in the determination at step SP31 described above, it performs the processing at step SP110 to SP122 of FIG. 19 as with the processing at step SP45 to step SP57 described above with reference to FIG. 13.

Incidentally, although a case was explained above where the 0-system controller 62A received a read command from the host computer 2A, the same applies when the 1-system controller 6B receives a read command from the host computer 2B.

(2-2) Effect of Present Embodiment

As described above, with the storage system 60 according to the present embodiment, since the exchange of necessary information between the 0-system and 1-system controllers 62A, 6B is performed via the local memories 14A, 14B, write commands and read commands can be exchanged between the 0-system and 1-system controllers 62A, 6B even when the host communication protocol chip 64A in the 0-system controller 62A does not possess a multi CPU support function, and the speed-up of processing can be sought thereby.

Further, with the storage system 60, for instance, when write commands and read commands targeting a logical unit handled by the 1-system processor 15B are given from the host computer 2A to the 0-system controller 62A, since the creation of the DMA list 50 and the like is conducted by the 1-system controller 6B and the processor 15A in the 0-system controller 6A only boots the self-system host communication protocol chip 64A, it is possible to alleviate the processing load of the microprocessor 15A that received the write commands and read commands from the command transfer source; that is, the host computer 2A.

(3) Other Embodiments

Incidentally, although the foregoing first and second embodiments described a case of applying host communication control units 10A, 63A, 10B for performing communication between the host computers 2A, 2B according to the same communication protocol as the host communication control units 10A, 62A, 10B of the 0-system and 1-system controllers 6A, 62A, 6B, the present invention is not limited thereto, and, for instance, a host communication control unit comprising a multi microprocessor function for communicating with the host computer 2A according to the FC protocol can be used in the 0-system controllers 6A, 62A, and a host communication control unit comprising a single microprocessor function for communicating with the host computer 2B according to the iSCSI protocol can be used in the 1-system controller 6B.

Further, although the foregoing first and second embodiments described a case of applying the present invention to the storage system 1, 60 which directly connect the host computers 2A, 2B and the storage controllers 3, 61, the present invention is not limited thereto, and the present invention can also be broadly applied to storage systems that connect the host computers 2A, 2B and the storage controllers 3, 61 via a network such as a SAN (Storage Area Network) or a LAN (Local Area Network).

Moreover, although the foregoing first and second embodiments described a case of using four storage apparatuses 4A to 4D to configure the storage systems 1, 60, the present invention is not limited thereto, and an arbitrary number of storage apparatuses 4A to 4D can be provided.

In addition, although the foregoing first and second embodiments described a case of configuring the 0-system and 1-system controllers 10A, 62A, 10B to have the same configuration, the present invention is not limited thereto, and the 0-system and 1-system controllers 10A, 62A, 10B may be configured differently.

Further, although the foregoing first and second embodiments explained a case where one host communication control unit 10A, 63A, 10B is provided to the 0-system and 1-system controllers 6A, 62A, 6B, respectively, the present invention is not limited thereto, and a plurality of host communication control units 10A, 63A, 10B may be provided.

In particular, the present invention can be applied to a storage apparatus comprising a plurality of microprocessors for controlling I/O requests of information from a host computer.

We claim:

1. A storage system for controlling the input and output of data to and from a plurality of logical units between a plurality of host computers, and a storage apparatus that provides the logical units configured from physical storage devices for reading and writing data from and in the host computers, the storage system comprising:

a first controller that includes a first cache memory and a first local memory for retaining a first command given from the host computers, wherein the first controller is configured to control the input and output of data to and from corresponding logical units based on the first command retained in the first local memory;

a second controller that includes a second cache memory and a second local memory for retaining a second command given from the host computers, wherein the second controller is configured to control the input and output of data to and from corresponding logical units based on the second command; and an inter-controller connection path for connecting the first and second controllers in a communicable state;

wherein each of the local memories stores association information representing a correspondence of the logical units and the first and second controllers;

wherein each of the local memories stores address information of the first or second local memory as a self-system or another-system; and wherein the first controller is configured:

to determine, upon receiving a third command sent from one host computer of the host computers, whether a target logical unit of the third command is associated with the first controller or the second controller based on the association information stored in the first local memory;

to transfer, when the target logical unit is associated with the second controller, the third command to the second controller; and to store the third command in the second local memory based on the address information;

wherein the second controller is configured:

to monitor the second local memory; and to generate, upon recognizing that the third command is stored in the second local memory, a Direct Memory Access (DMA) list based on the third command; and to store the DMA list in the second local memory;

to set a register in a host communication protocol chip in the first controller to boot the host communication protocol chip;

to send a command to the first controller to perform data transfer according to the DMA list;

wherein the first controller is further configured:
  to read the DMA list from the second local memory;
  to receive write data from the one host computer of the host computers;
  to store the write data in the first cache memory based on the DMA list; and
  to store the write data in the second cache memory.

2. The storage system according to claim 1, wherein the first local memory includes a first storage extent for storing the third command, and the second local memory includes a second storage extent for storing the third command.

3. The storage system according to claim 1, wherein the first controller is configured to use the first cache memory for temporarily storing data sent and received between the one host computer and the storage apparatus;
  wherein the second controller is configured to use the second cache memory for temporarily storing data sent and received between the one host computer and the storage apparatus;
  wherein the second controller is configured to copy data stored in the second cache memory to the first cache memory; and
  wherein the storage system is configured to use data copied to the first cache memory to control data transfer between the one host computer and the first cache memory.

4. The storage system according to claim 3, wherein the first cache memory includes a first data storage extent for storing the data from the one host computer or the storage apparatus, and includes a second data storage extent for storing the data copied by the second controller.

5. The storage system according to claim 1, wherein the inter-controller connection path is a bus based on a PCI (Peripheral Component Interconnect)-Express standard.

6. The storage system according to claim 5, wherein the first controller is configured to notify the second controller of information using MSI (Message Signal Interrupt).

7. A method for use in a storage system for controlling the input and output of data to and from a plurality of logical units between a plurality of host computers, and a storage apparatus that provides the logical units configured from physical storage devices for reading and writing data from and in the host computers, wherein the storage system comprises:
  a first controller that includes a first cache memory and a first local memory for retaining a first command given from the host computers, wherein the first controller is configured to control the input and output of data to and from corresponding logical units based on the first command retained in the first local memory;
  a second controller that includes a second cache memory and a second local memory for retaining a second command given from the host computers, wherein the second controller is configured to control the input and output of data to and from corresponding logical units based on the second command; and
  an inter-controller connection path for connecting the first and second controllers in a communicable state;
  wherein each of the local memories stores association information representing a correspondence of the logical units and the first and second controllers; and
  wherein each of the local memories stores address information of the first or second local memory as a self-system or another-system; and
wherein the method comprises:
  the first controller, upon receiving a third command sent from one host computer of the host computers, determining whether a target logical unit of the third command is associated with the first controller or the second controller based on the association information stored in the first local memory; and
  the first controller, when the target logical unit is associated with the second controller, transferring the third command to the second controller and storing the third command in the second local memory based on the address information;
  the second controller monitoring the second local memory and creating, upon recognizing that the third command is stored in the second local memory, a Direct Memory Access (DMA) list based on the third command;
  the second controller setting a register in a host communication protocol chip in the first controller to boot the host communication protocol chip;
  the second controller sending a command to the first controller to perform data transfer according to the DMA list;
  the second controller reading the DMA list from the second local memory;
  the second controller receiving write data from the one host computer of the host computers;
  the second controller storing the write data in the first cache memory based on the DMA list; and
  the second controller storing the write data in the second cache memory.

8. The method according to claim 7, wherein the first local memory includes a first storage extent for storing the third command, and the second local memory includes a second storage extent for storing the third command.

9. The method according to claim 7, wherein the first controller is configured to use the first cache memory for temporarily storing data sent and received between the one host computer and the storage apparatus;
  wherein the second controller is configured to use the second cache memory for temporarily storing data sent and received between the one host computer and the storage apparatus;
  wherein the second controller is configured to copy data stored in the second cache memory to the first cache memory; and
  wherein the method further comprises:
  the first controller using data copied to the first cache memory to control data transfer between the one host computer and the first cache memory.

10. The method according to claim 9, wherein the first cache memory includes a first data storage extent for storing the data from the one host computer or the storage apparatus, and includes a second data storage extent for storing the data copied by the second controller.

11. The method according to claim 7, wherein the inter-controller connection path is a bus based on a PCI (Peripheral Component Interconnect)-Express standard.

12. The method according to claim 11, wherein the first controller notifies the second controller of information using MSI (Message Signal Interrupt).

* * * * *